United States Patent
Darbi

(10) Patent No.: US 10,848,242 B2
(45) Date of Patent: Nov. 24, 2020

(54) SYSTEM AND METHOD FOR PROVIDING OPTICALLY CODING OF INFORMATION COMBINING COLOR AND LUMINOSITY

(71) Applicant: BRIGHTCODES TECHNOLOGIES LTD., Tel Aviv (IL)

(72) Inventor: Amir Darbi, Tel Aviv (IL)

(73) Assignee: BRIGHTCODES TECHNOLOGIES Ltd., Tel Aviv (IL)

( * ) Notice: Subject to any disclaimer, the term of this patent is extended or adjusted under 35 U.S.C. 154(b) by 0 days.

(21) Appl. No.: 15/930,461

(22) Filed: May 13, 2020

(65) Prior Publication Data

US 2020/0287624 A1    Sep. 10, 2020

Related U.S. Application Data

(63) Continuation-in-part of application No. 16/355,880, filed on Mar. 18, 2019, now Pat. No. 10,680,711, which is a continuation of application No. 15/538,211, filed as application No. PCT/IL2016/050148 on Feb. 9, 2016, now Pat. No. 10,277,317.

(60) Provisional application No. 62/202,257, filed on Aug. 7, 2015, provisional application No. 62/256,138, filed on Nov. 17, 2015, provisional application No. 62/114,089, filed on Feb. 10, 2015.

(51) Int. Cl.

| | |
|---|---|
| *H04J 14/00* | (2006.01) |
| *H04B 10/116* | (2013.01) |
| *H04J 14/02* | (2006.01) |
| *H04B 10/85* | (2013.01) |
| *H04B 10/66* | (2013.01) |

(52) U.S. Cl.
CPC .......... *H04B 10/116* (2013.01); *H04B 10/66* (2013.01); *H04B 10/85* (2013.01); *H04J 14/02* (2013.01); *H04J 14/00* (2013.01)

(58) Field of Classification Search
CPC ...... H04B 10/116; H04B 10/66; H04B 10/85; H04J 14/02; H04J 14/00
USPC .......................................................... 398/43
See application file for complete search history.

(56) References Cited

U.S. PATENT DOCUMENTS

| | | | | |
|---|---|---|---|---|
| 2007/0222743 | A1* | 9/2007 | Hirakata | G09G 3/3651 345/102 |
| 2010/0201894 | A1* | 8/2010 | Nakayama | H04N 9/3185 348/745 |
| 2016/0191158 | A1* | 6/2016 | Aoyama | H04B 10/54 398/172 |

* cited by examiner

*Primary Examiner* — Don N Vo
(74) *Attorney, Agent, or Firm* — Kligler & Associates Patent Attorneys Ltd

(57) ABSTRACT

An active optical machine-readable tag that is addressable and readable within a line-of-sight of a reader device equipped with a camera, at substantially large distances. The active optical tag and the camera-based reader may use a method of asynchronous communication reducing the flicker associated with the low-frequency optical carrier to a level hardly noticeable by people. The method of transmitting data may include determining length of a repetitive time period not longer than time resolution of a human eye, emitting a first sequence of light pulses within the time period, the light pulses including pulses of complementary colors and pulses of different levels of luminosity; and determining the order of the colors and levels of luminosity of the first sequence of light pulses emitted within the time period to represent a symbol, and to achieve perceived chromaticity and luminosity that is substantially constant to a human eye.

15 Claims, 21 Drawing Sheets

SYSTEM AND METHOD FOR PROVIDING OPTICALLY CODING OF INFORMATION COMBINING COLOR AND LUMINOSITY

CROSS-REFERENCE TO RELATED APPLICATIONS

This application is a continuation-in-part of U.S. patent application Ser. No. 16/355,880, filed Mar. 18, 2019, which is a continuation of U.S. patent application Ser. No. 15/538,211, now U.S. Pat. No. 10,277,317, which is a national phase of PCT application PCT/IL2016/050148, which claims the benefit of U.S. provisional applications 62/114,089, filed Feb. 10, 2015, 62/202,257 filed Aug. 7, 2015, and 62/256,138, filed Nov. 17, 2015, the disclosures of all of which are incorporated herein by reference in their entirety.

FIELD OF THE INVENTION

The present invention relates to communication, and, more particularly but not exclusively, to optical communication, and, more particularly but not exclusively to systems and methods for optically coding communication between an optical transmitter and a camera-based receiver that is not perceived by the human eye.

BACKGROUND OF THE INVENTION

In recent years, an increasing number of various technologies have been used to improve user engagement with physical objects and scenes, for example using software applications for mobile devices. Such "environment conscious" applications typically retrieve object-related content from an external source (e.g. the internet) and present it to the user. Real-world mobile engagement generally occurs in one of two ways, wherein information content is delivered to the user based on location ("push" interactions), or upon an interaction with an object ("pull" interactions) such that users are granted full control over the information content they consume.

While there are several mobile device positioning technologies available for the deployment of "push"-oriented applications (e.g. GPS, etc.), "pull"-oriented applications are still impractical for many indoor and outdoor scenarios. This is mainly because current mobile engagement technologies have inherent limitations when it comes to directional targeting, operating range, and basic security.

Specifically, these technologies either require a short range of operation with Near Field Communication (NFC), a sufficiently large tag to be detected from a distance with a Quick Response (QR) code, or provide information about distance but not direction to object with Bluetooth Low Energy (BLE) communication. Image recognition may also be problematic because it typically suffers from high latencies and because objects are not identified uniquely. Both technologies are effective only in very small distances.

For Pull interactions to work effectively in any indoor and outdoor environment, objects of interest should be targetable from users' immediate position without having to approach the objects. The users should also be able to retrieve information that relates to the exact object they target. For example, obtain promotional information about a real-estate project when driving by, or get a discount coupon while watching a billboard ad from a large distance.

SUMMARY OF THE INVENTION

It is an object of the present invention to provide an active optical machine-readable tag (i.e. optical tag) that is addressable and readable within a line-of-sight of a reader device at substantially large distances. It is obviously advantageous to have a receiver device (reader) that is already available to the user, such as a video camera of a smartphone operating as an optical sensor, or a similar mobile device equipped with a video camera.

A further object of the present invention is to provide a method and a system for an active optical tag and a camera-based reader thereof that facilitate asynchronous communication at data rates that are sufficiently high for practical uses, while reducing the flicker associated with the low-frequency optical carrier to a level hardly noticeable by people.

Systems and methods are provided for conveying digital information comprising an active optical tag employing visible light to transmit the information and a camera-based receiver to receive the information, wherein the information may pertain to the optical tag or to a real-world object attached to the tag.

There is thus provided, in accordance with a preferred embodiment of the invention, a method for communicating information, the method including determining length of a repetitive time period not longer than time resolution of a human eye, emitting a first sequence of light pulses within the time period, the light pulses including pulses of complementary colors and pulses of different levels of luminosity, and determining order of the colors and levels of luminosity of the first sequence of light pulses emitted within the time period to represent a symbol, and to achieve cumulative chromaticity and cumulative luminosity (and/or perceived chromaticity and perceived luminosity) that are substantially constant to a human eye.

Further, the method may also include emitting a second sequence of light pulses within the time period, the light pulses of the second sequence including pulses of complementary colors and pulses of different levels of luminosity to achieve perceived chromaticity and luminosity that is substantially constant to a human eye, and determining order of the colors and levels of luminosity of the first sequence of light pulses emitted within the time period to represent a symbol based on at least one of: time correlation, color correlation, and luminosity correlation, with the second sequence of light pulses. It is appreciated that the cumulative or perceived chromaticity of the first sequence of light pulses and the second sequence of light pulses is substantially constant to a human eye.

Yet further, the method may also include each light pulse followed by a time period of no light, where the length of time of the light pulse and the following time period of no light is smaller than the inverse of the frame rate of a standard camera.

Still further, the method may also include a transmitter device including at least one data light emitting element. The data light emitting element including a first group of at least one sub-emitter configured to emit light at respective first color and at least two levels of luminosity, and a second group of at least one sub-emitter configured to emit light at respective second color mutually complementary to the first color and at least two levels of luminosity.

Even further, the method may also include modulating light emissions of the data light emitting element to emit at least two symbols of the information during two clock periods including a sequence of: a first light pulse including the first color having a first intensity, during a first part of a first clock period, followed by a second light pulse including the second color having a second intensity, during a second part of the first clock period, followed by a third light pulse including the first color having a third intensity, during a first part of a second clock period, and followed by a fourth light pulse including the second color having a fourth intensity, during a second part of the second clock period. The first, second, third and fourth light pulses are arranged so that the perceived luminosity of the first, second, third and fourth light pulses is substantially equal during the repeating clock periods, and/or the perceived chromaticity of the first, second, third and fourth light pulses during the repeating clock periods is substantially constant.

Additionally, in accordance with a preferred embodiment of the invention, the method for communicating information may also include at least one of: at least one of cumulative intensity and average intensity of the pulses of the first and second colors during the first and second clock periods is perceived as substantially equal for a plurality of repeating clock periods, and the intensity of the pulses of the first color is substantially different within each of the repeating clock periods, and the intensity of the pulses of the second color is substantially different within each of the repeating clock periods.

Further, the method may include a particular order of colors and intensities (luminosity levels) of the light pulses within the clock period representing a particular symbol.

Yet further, the method may include providing one or more clock light emitting elements, where each light element may include a third group of at least one sub-emitter configured to emit light at respective third color and at least two intensity levels, and a fourth group of at least one sub-emitter configured to emit light at respective fourth color mutually complementary to the third color and at least two intensity levels.

The method may also include modulating light emissions of the clock light emitting element including repeated clock periods including a sequence of light pulses including: a first light pulse including the third color having a first intensity, during a first part of a first clock period, followed by a second light pulse including the fourth color having a second intensity, during the second part of the first clock period, and followed by a third light pulse including the first color having a third intensity, during a first part of a second clock period, followed by a fourth light pulse including the second color having a fourth intensity, during a second part of the second clock period. The first, second, third and fourth light pulses may be arranged so that the perceived luminosity of the first, second, third and fourth light pulses is substantially equal during the repeating clock periods, and/or the perceived chromaticity of the first, second, third and fourth light pulses during the repeating clock periods is substantially constant.

Still further, the method may also include a receiver device operative to determine the symbol using correlation between the light pulses of the clock light emitting element and the light pulses of the at least one data light emitting element, and determining order of intensities of the light pulses of the at least one data light emitting element in correlation with order of the intensities of the light pulses of the clock light emitting element to represent the symbol.

There is further provided in accordance with embodiments of the present invention, a method for communicating information in a plurality of symbols, including setting a time period length not longer than the time resolution of the human eye, for transmission of the symbols, for each of the symbols, selecting one or more parameter values of a light pulse to represent the symbol; and emitting, for each of the symbols, a first sequence of light pulses within respective time periods of the set time period length, a first one of the emitted light pulses having the selected one or more parameter values, and one or more second ones of the light pulses comprising pulses of complementary parameter values selected to achieve a perceived chromaticity and luminosity that is substantially constant to a human eye.

Optionally, selecting the one or more parameter values comprises selecting a color from a plurality of colors which represent different symbol values, and wherein emitting the first sequence of light pulses comprises emitting a first pulse of the selected color and one or more second pulses of a complementary color to the selected color. Alternatively or additionally, selecting the one or more parameter values comprises selecting a light intensity level from a plurality of levels which represent different symbol values, and wherein emitting the first sequence of light pulses comprises emitting a first pulse of the selected light intensity level and one or more second pulses of a complementary intensity level, different from the intensity level of the first pulse, such that the combined intensity levels of the first and one or more second pulses is equal to a predetermined value.

Optionally, the plurality of levels which represent different symbol values comprises at least four different intensity levels which represent different symbol values.

In some embodiments, emitting, for each of the symbols, a sequence of light pulses comprises emitting a first pulse having a first color and a first intensity level and three second pulses, including one second pulse having the first color and a second intensity complementary to the first intensity, and two additional second pulses of a second color, complementary to the first color, having two different respective light intensity levels.

Optionally, the method further includes emitting a at least one second sequence of light pulses to serve as a clock signal, the second sequence including a plurality of pulses in a first color in at least two different intensity levels and a plurality of pulses in a second color, in at least two different intensity levels.

Optionally, the method further includes transmitting a clock signal including a plurality of light pulses in each of the time periods. Optionally, the light pulses of the clock signal in each time period comprise a plurality of light pulses of a plurality of different colors.

Optionally, the light pulses of the clock signal in each time period comprise a plurality of light pulses of a plurality of different intensity levels. Optionally, emitting the light pulses for the symbols comprises emitting by a first light emitting element and transmitting the clock signal comprises transmitting by a second light emitting element, different from the first light emitting element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
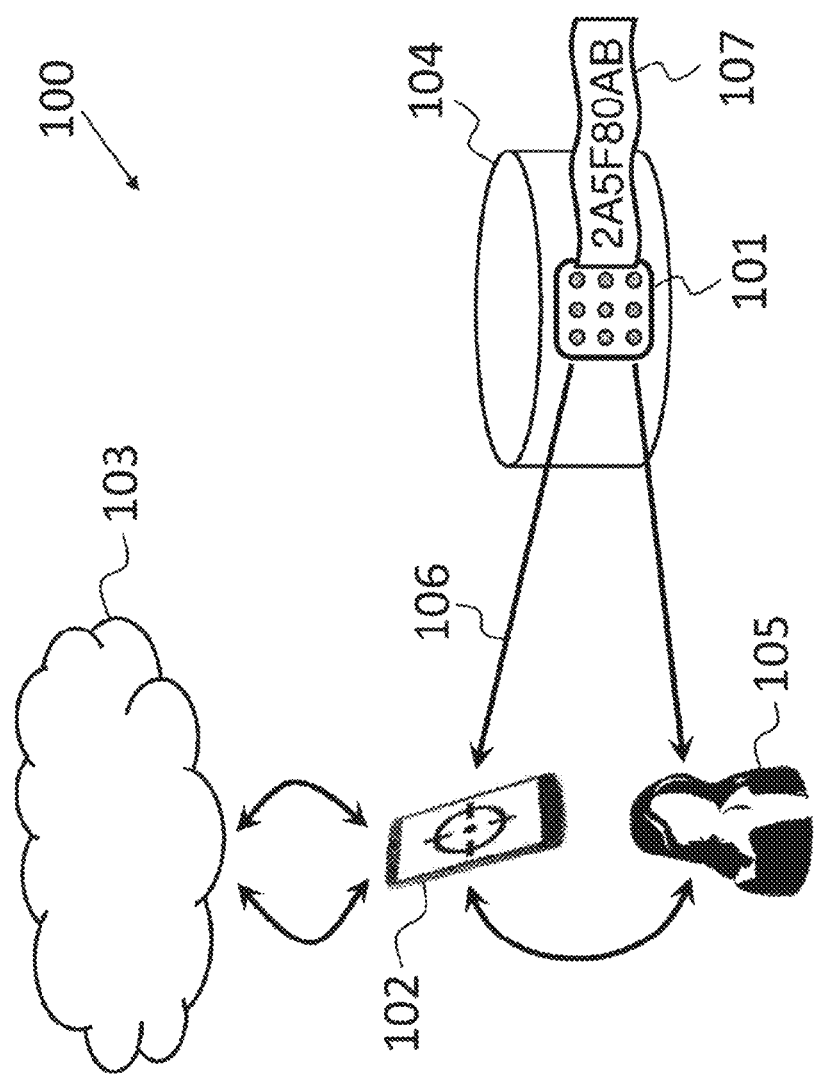
FIG. 1 schematically illustrates a system for conveying machine-readable information, according to an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

According to some embodiments of the invention, an active optical machine-readable tag (i.e. optical tag) may be operable using Visible Light Communication (VLC). It is appreciated that VLC allows digital information to be wirelessly transmitted via modulation of light beams emitted by one or more light-emitting elements with ubiquitous computing, for instance Light Emitting Diodes (LEDs) may transmit signals at 500 MHz, and some LEDs may also transmit at faster frequencies.

However, the use of some commercially available mobile cameras as the light sensor for a receiver may impose several challenges, mostly relating to the low sampling rate, typically around 30 frames per second in most of current mobile devices. It should be noted that the main concerns are: low frequency light oscillations may be perceived as disturbing flicker to the human eye, low bit-rate may result in unacceptably long transmission times, and the receiver (i.e. the camera) may not be synchronized with the transmitter (i.e. the optical tag).

In some embodiments of the invention, an optical tag is provided, comprising a single light-emitting element or a plurality of light-emitting elements generally distributed in an array of some shape. It is appreciated that at least some of the light emitting elements may comprise adjacent sub-emitters, each emitting light in a different wavelength.

Referring now to FIG. 1, which schematically illustrates a system for conveying machine-readable information, generally designated 100, according to some embodiments of the invention. System 100 comprises an optical machine-readable tag 101 having a plurality of light emitting elements, a mobile device 102 operable as a reader of optical tag 101 and an external computerized device 103 in communication with mobile device 102. It is appreciated that mobile device 102 may be any computerized device having means (e.g. a camera) for reading a tag, such as a mobile phone, a tablet, a digital camera, a laptop, wearable devices such as a smart-watch, any other mobile computerized device, or a combination thereof. Furthermore, it is appreciated that external computerized device 103 may be any device, in a network (wired or wireless) communication with mobile device 102, having processing and memory means such as a PC, a server, a database, or a combination thereof.

In some embodiments, external computerized device 103 may be configured to allow processing of data from mobile device 102, for instance external computerized device 103 may be a cloud based server in wireless communication with mobile device 102. In some embodiments, the light emitting elements of optical tag 101 may be arranged in a single two-dimensional array.

In some embodiments, optical tag 101 may be connected to a tangible object 104 which is within a line of sight of a user 105 and also of mobile device 102. Mobile device 102 may include a commercially available video camera that user 105 may aim at the direction of optical tag 101 in order to read machine-readable information 106 therefrom. It should be noted that machine-readable information 106 may be conveyed via modulation of the light beams from the plurality of light emitting elements.

It is appreciated that said beam modulation may be manifested as nearly uniform illumination to the average human eye (with negligible noticeable flicker or with no noticeable flicker at all), by employing sufficiently high carrier frequencies. Yet, the corresponding machine-readable information may be conveyed at lower frequencies (or rates) that commensurate with frame rates of commercially available mobile cameras (typically about 30 frames per second).

According to some embodiments, the light emitting elements of optical tag 101 are monochromatic LEDs, wherein the light emitting elements may also be multi-color LEDs. Each LED may emit light in at least three primary colors (typically: Red, Green and Blue). Infrared (IR) LEDs may also be used with optical tag 101, as long as the wavelength of their emission may be detectable by image sensors found in commercially available mobile cameras, as further described hereinafter. It is appreciated that optical tag 101 disclosed herein may employ any type of light sources capable of emitting monochromatic or multi-colored light, the intensities of which may be changed at very high rates. Unless otherwise specified, the term LED shall be used henceforth to denote a light emitting element.

According to some embodiments, the light emitting element of optical tag 101 may be a cluster of several LEDs all transmitting corresponding and/or identical information. This feature may be particularly useful in cases where a light emitting element is designed to occupy an area, and/or have beam intensity, that are larger than achievable using a single LED. Similarly, the light emitting element may be a distinct cluster of irradiating pixels in a video display of the kind found in TV sets, computers, mobile devices, etc.

According to some embodiments, machine-readable information 106 conveyed by optical tag 101 may include at least one unique identification code (UID) 107. The reader device 102 may use UID(s) to retrieve tag-specific content stored in external computerized device 103, for instance via a wireless network connection. In some embodiments, UIDs may be hardcoded such that each optical tag 101 is explicitly identified, and thus may achieve resistance against imitation or replication attempts.

It is appreciated that modulated light beams emanating from various light emitting elements of optical tag 101 may reach the image sensor(s) of reader device 102 via some indirect paths. For example, the light beams may be deflected by one or more successive reflecting surfaces before reaching reader device 102 that is located within a line-of-sight of the farthest reflecting surface. Said farthest reflecting surface may be diffusive to some extent to allow multiple receivers 102 to read optical tag's 101 information 106 when positioned at different angles relative to that farthest reflecting surface.

According to some embodiments, a cloud server in communication with the reader of the optical tag, may receive a UID(s) of the optical tag and thereby send back to the reader digital content pertaining to that specific optical tag and/or instructions regarding the proper use of said digital content. In some embodiments, the cloud server may further receive from the reader of the optical tag additional information related to the scene wherein the optical tag may be embedded and/or pertaining to the reader device and/or pertaining to the user operating the reader device. Such information may be processed by the server in conjunction with the UID(s) so that the server may send back to the reader device digital content that matches preferences of the user operating the reader device and/or preferences of the owner of the optical tag.

Figure 2:
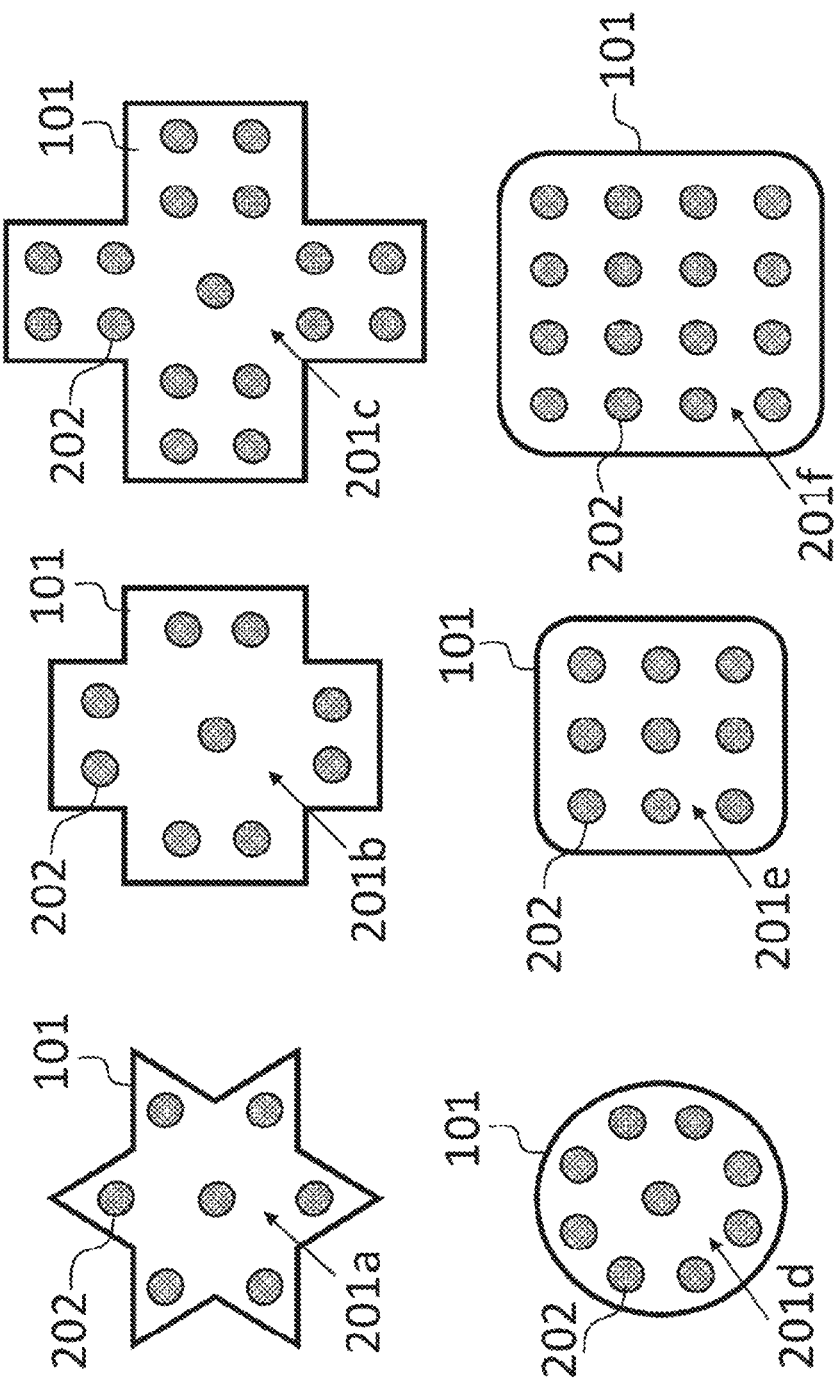
FIG. 2 schematically illustrates several representations of differently shaped arrays of light emitting elements of an optical tag, according to an embodiment of the present invention.

Referring now to FIG. 2, which schematically illustrates several representations of differently shaped arrays 201a-201f of light emitting elements 202 of optical tag 101, according to some embodiments of the invention. It is appreciated that multi-colored LEDs normally emit three primary colors (Red, Green, Blue) and thus can convey up to three discrete streams, or channels of binary information using simple on-off keying (OOK), as further described hereinafter.

It is appreciated that the number of LEDs 202 embedded in an array (or sub-array) of an optical tag 101 and the spatial dispersion of the LEDs may be determined based on various design parameters, such as the nominal reading distance of optical tag 101 as well as the desirable bit rate (i.e. transmission throughput). Design considerations may include optical effects that govern the size of the projection (in pixels) a light pulse has on the image sensor of the receiver mobile device 102. It is therefore desired to avoid excessive overlap of adjoining LED projections, in order to allow the reader algorithms to discriminate the signals conveyed by the LEDs 202.

Thus, there may be a tradeoff between overall bit rate and the size of optical tag 101. In some embodiments, it is desired to minimize the size of optical tag 101 while maximizing the throughput. Since the feasible bit rate by a single color channel of an LED 202 may be limited by the sampling rate of the receiver (e.g. ~30 frames per second), the number of LEDs 202 in an array may be in fact a key design parameter. For many practical uses, a 3×3 LED array may be a practical choice in terms of form-factor vs throughput. Nevertheless, any number of light emitting elements 202, such as, but not limited to: 1, 2, 4, 5, 7, 9, 16, or 17 may be spatially arranged in each array or sub-array of optical tag 101.

Figure 3:
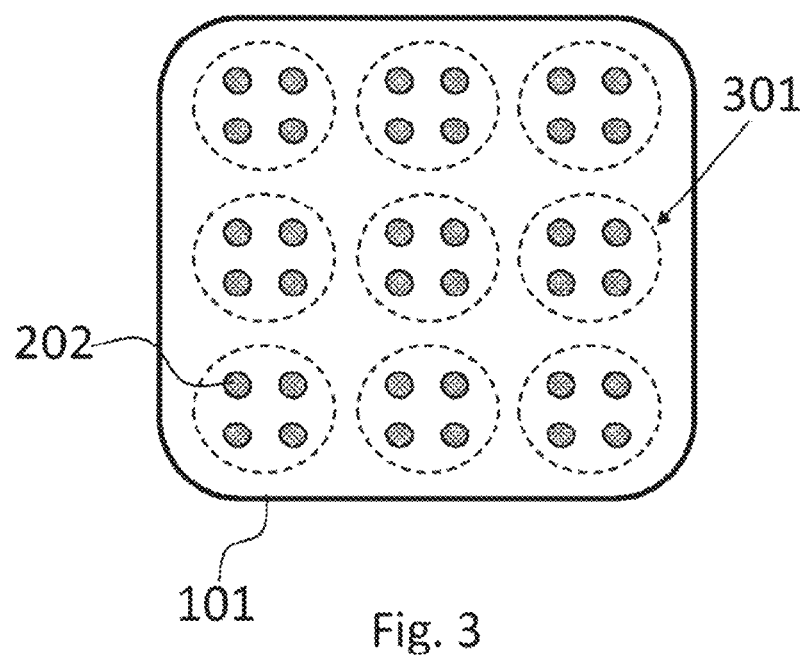
FIG. 3 schematically illustrates several notions of sub-arrays and of multi-LED light emitting elements, according to an embodiment of the present invention.

Referring now to FIG. 3, which schematically illustrates several notions of sub-arrays and of multi-LED light emitting elements 202, according to some embodiments of the invention. In some embodiments, the LED array of optical tag 101 may comprise nine sub-arrays 301, each consisting of for example four LEDs 202. Such sub-arrays 301 may convey independent data packets, and therefore optical tag

101 may simultaneously convey nine different pieces of information. Optionally, all LEDs 202 of a sub-array 301 may be configured to transmit identical signals, thus rendering each sub-array 301 into a "single" light emitting element providing a stronger light source. The latter case may be useful where the size and/or the illumination power of commercially available LEDs may be insufficient for the requirements of a particular tag design.

In some embodiments, optical tag 101 may comprise an internal (or external) controller. This controller may modulate the intensity of the light emitted by each sub-emitter of each LED of optical tag 101 in order to convey information using one or more of signal encoding schemes, further described hereinafter. The transmission protocol may additionally include various signal manipulation techniques that are utilized for optical communication.

According to some embodiments, on-off keying (OOK) may be used to modulate the light emission of the LEDs, representing digital data as the presence or absence of a carrier wave. Namely, a light pulse of prescribed intensity of a specific primary color (e.g. Red, Green or Blue) represents '1' symbol in that channel, and absence of light represents '0' symbol. Nevertheless, other coding schemes, such as (but not limited to) amplitude-shift keying (ASK), may also be used to modulate the light emission of the LEDs.

It should be noted that the notion of "channels" being used here relies on the fact that typical mobile cameras incorporate distinct Red, Green and Blue light sensors (or color filters) that are sensitive to wavelengths similar to those emitted by RGB LEDs. Thus, camera-based tag readers may detect and evaluate three different signals sent by the three different color elements of a single LED. Thereby, an RGB LED may be regarded as simultaneously transmitting three discrete data channels. Optionally, color normalization may be performed in order to improve color contrast and reduce cross-channel errors.

Figure 4:
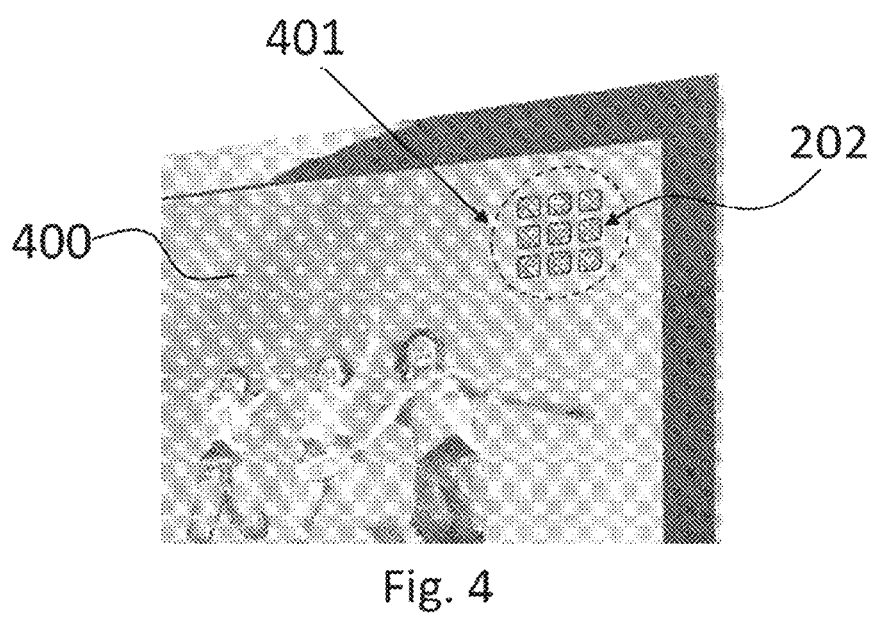
FIG. 4 schematically illustrates an arrangement where a projected optical tag is embodied in a video stream projected by a video display, according to an embodiment of the present invention.

Referring now to FIG. 4, which schematically illustrates an arrangement where a projected optical tag 401 is embodied in a video stream projected by a video display 400 (or by a video projector projecting onto a reflective screen), according to some embodiments of the invention. It is appreciated that each light emitting element 202 may be a cluster of RGB pixels working in tandem, such that projected optical tag 401 may be created.

It should be noted that data packets carrying the information of optical tag 101 may be continually transmitted, such that following the end of one data packet comes the beginning of a second, sequential and identical data packet. Specifically, identical packets are transmitted in a repetitive manner such that the trailing part of one packet may be followed by the header of the next packet. In some embodiments, only portions of the sequential data packets are identical, whereas other portions (e.g. a security code) may change in time, as further described hereinafter.

In some embodiments, a limited number of data packets, or even a single packet, may be transmitted following the detection of some wake-up signal external to optical tag 101. For example, a burst of a camera flash initiated by the reader device may initiate transmission of at least one data packet. It should be noted that such initiation may be particularly useful in cases where optical tag 101 is battery-operated and energy must be conserved.

In some embodiments, the information of optical tag 101 may be arranged into a single data packet, or several independent data packets, of finite lengths. Independent data packets may be transmitted using separate clusters (or sub-arrays) of LEDs arranged in different locations across the transmitting surface of optical tag 101. It is appreciated that henceforth, references made to transmission of a data packet may also mean the simultaneous transmission of multiple independent data packets, all based on a single clock, or several synchronized clock signals.

In some embodiments, spatio-temporal multiplexing may be used to split the transmission of a data packet among at least some of LEDs 202 in the corresponding sub-array, for example sub-array 301 (as shown in FIG. 3). Thus, each LED 202 may transmit a portion of the data, concurrently with all the other LEDs based on a common clock. For example: a 24 bits data packet may be encoded using eight monochromatic LEDs, wherein each LED transmits three consecutive binary digits during three consecutive clock cycles.

According to some embodiments, the effective viewing angle of an optical tag may be constrained by selecting LED types based on their beam angle (e.g. spatial angle of half intensity). For example, laser diode emitters may be used to construct a directional optical tag that conveys information to a localized region in space and/or to gain longer effective distances.

Figure 5:
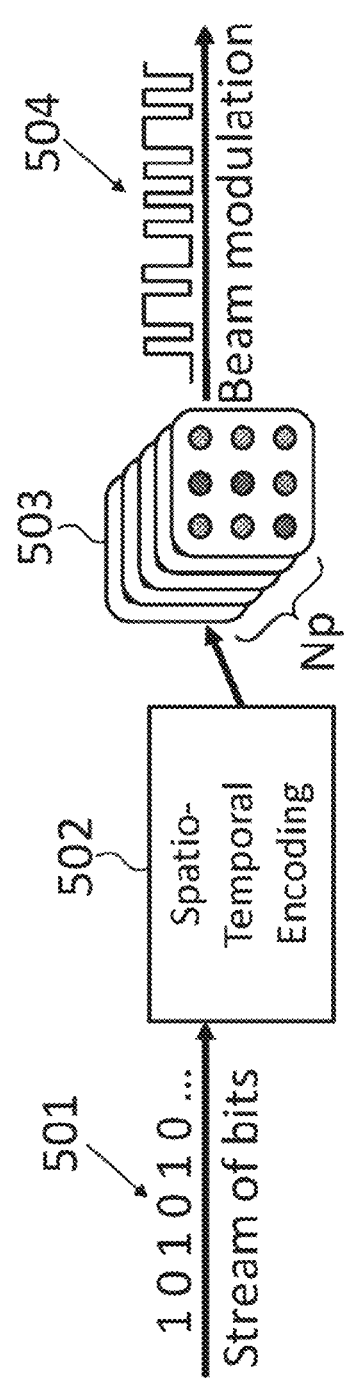
FIG. 5 shows a flow diagram illustrating the transmission process of the optical tag, according to an embodiment of the present invention.

Referring now to FIG. 5, which shows a flow diagram illustrating the transmission process of optical tag 101, according to some embodiments of the invention. It should be noted that the bit stream 501 carrying the information of optical tag 101 may be encoded using the spatio-temporal encoder 502 before being transmitted by the LEDs 202.

There may be numerous ways by which a stream of binary signals can be multiplexed across the three dimensions of the optical carrier: the temporal, the spatial and the color dimensions. One basic approach is to slice the data packet to be transmitted into "Np" data blocks 503 such that each data block is spatially encoded and transmitted using all the LEDs of the array (or sub-array). The data blocks are transmitted consecutively via modulated light beams 504 of the LEDs at a rate that commensurate with the typical frame rate of the receiver device (e.g. a camera). Optionally, the entire data packet may be transmitted, once that all of the data blocks had been transmitted.

Figure 6:
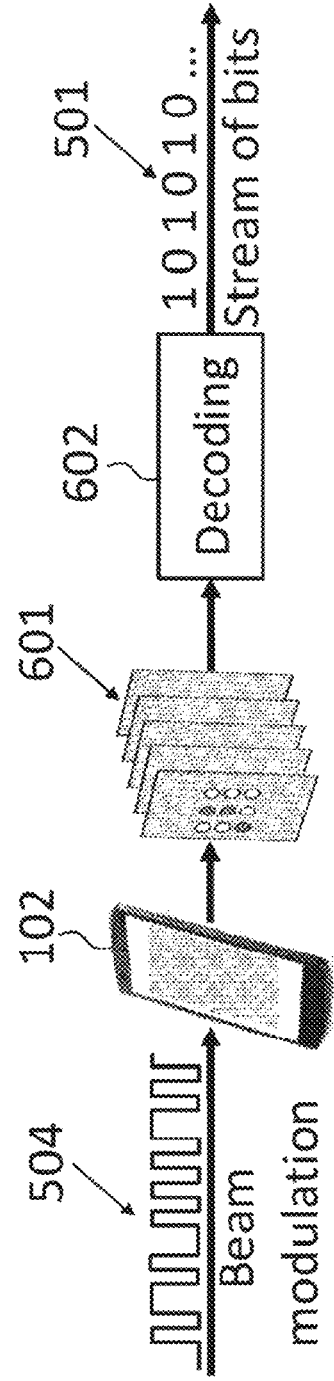
FIG. 6 shows a block diagram demonstrating the bit stream transmitted by the optical tag and restored at the receiver side, according to an embodiment of the present invention.

Referring now to FIG. 6, which shows a block diagram demonstrating the bit stream 501 transmitted by optical tag 101 and restored at the receiver side, according to some embodiments of the invention. It should be noted that the modulated light beams 504 of the LEDs may be first recorded by the image sensor of the receiver mobile device across a series of at least "Np" consecutive video frames 601. The transmission protocol guarantees that every data block sent by optical tag 101 may be captured by at least one of said consecutive video frames 601, wherein the nature of the transmission may be asynchronous. The bit stream 501, comprising the original data packet, may then be restored by decoder 602 using the "Np" video frames 601. In some embodiments, a larger number of video frames 601 may also be utilized, depending on the general actual error-level of the transmission.

It is appreciated that the information included in a data packet may be constant or it may change with time. It may also originate from different sources: portions of the information may be permanently stored in a memory of the optical tag. Other portions of the information may be passed to the controller of the optical tag by some internal or external component, such as a temperature sensor or a pressure gage. Yet other portions of the information may be time-dependent variables used for security purposes and/or for authentication of the optical tag. Further portions of the information may relate to error recovery mechanisms.

In some embodiments, the binary information of the optical tag may be transformed using certain error-correction codes prior to the actual transmission to enable some level of error recovery at the receiver side. Error-correcting codes may include (but are not limited to) "BCH codes", "Reed-Solomon codes", "turbo codes", "Hamming codes", etc.

According to some embodiments, a reader apparatus corresponding to the optical tag is provided (for instance as shown in FIG. 6), comprising a video camera, a processing unit and a compatible tag reading algorithm. In some embodiments, the reader may be a camera-equipped mobile device, such as (but not limited to) a smartphone, for instance executing a dedicated tag reader application.

When reading the information sent by the optical tag, a dedicated tag reading algorithm (embedded in the reader device) may instruct an image sensor of the camera to capture a series of consecutive video frames and store these images in the memory of the device. It should be noted that the number of consecutive captured frames should be sufficiently large to include the binary data of at least one instance of the data packet(s) transmitted by the optical tag.

If the reader device is positioned within a line-of-sight of the optical tag, targeting the tag (or a furthest reflecting surface thereof), each frame captured by the receiver device may include projections of the monochromatic or multi-colored light pulses emitted by the LEDs during the exposure time of that frame. In some embodiments, the dedicated tag reading algorithm may control settings of the camera (such as shutter speed), in order to make sure that the exposure is in accordance with requirements of the transmission protocol.

In some embodiments, light pulses may be recorded by the image sensor of the receiver device as clusters of pixels having elevated brightness in at least one color channel. The size and shape, as well as hue and brightness distributions, of the clusters may depend on various factors, such as: the illumination intensity of the light source (e.g. the LED), the distance and the angle between the light source and the receiver device (e.g. the camera), the optics of the receiver and their settings, atmospheric effects, ambient light, etc.

In some embodiments, the lighting intensity of color pulses emitted by an LED may be modified in order to provide illumination that does not disturb the human eye, since some colors at similar intensities may appear different to the observer.

Once captured, the dedicated tag reading algorithm may analyze the series of consecutive video frames in order to detect all the projections of light pulses emitted during the exposure time of the frames. Pulse detection may be based on algorithms dedicated for computer vision and object recognition, which may exploit different characteristics of LED projections, like color, shape and the intermittency to discriminate them from the image background.

Figure 7:
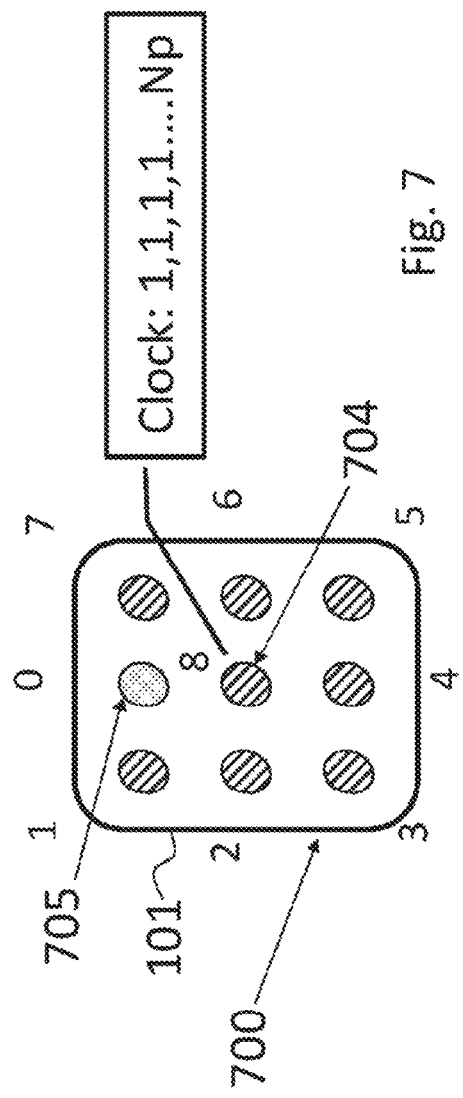
FIG. 7 schematically illustrates a nine LED array, according to an embodiment of the present invention.
Figure 8:
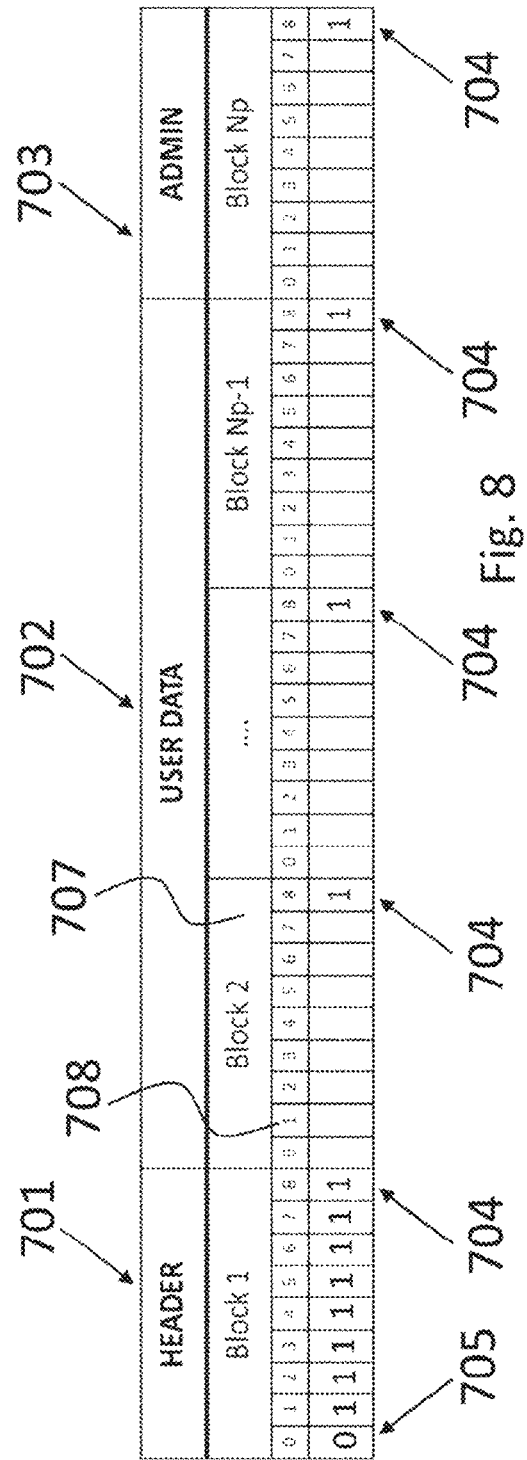
FIG. 8 illustrates an optional structure of a data packet conveyed by the optical tag, according to an embodiment of the present invention.

Referring now to FIGS. 7-8, which illustrate an optical tag 700 with a nine LED array and an optional corresponding structure of a data packet conveyed by the optical tag 700 respectively, according to some embodiments of the invention. It should be noted that in this example the optical tag 700 includes nine LEDs, each LED is transmitting a single data channel. The same structure of data packets may apply to any other number of LEDs with some minor modifications.

It is appreciated that the data packet in this example consists of "Np" data blocks 707. The data packet may be divided into three parts: a header part 701 (or start frame delimiter) represented by a first data block ("Block 1") 707, a payload (or body) part 702 represented by Np-2 data blocks 707, and a trailer part 703 represented by a last data block ("Block Np") 707. It is appreciated that each block may be conveyed by the LED emissions during a single frame-to-frame period of the receiver camera. In some embodiments, the header part 701 may include multiple data blocks, and similarly the trailer part 703 may include multiple data blocks. It should be noted that typically, several identical data blocks may be transmitted during each frame-to-frame period of the receiver camera to accommodate with carrier frequencies of the optical tag that are substantially higher than the frame rates of ordinary receiver cameras.

The header part 701 denotes the beginning of the transmission of the payload part 702 of the packet. The header part 701 may consist of some non-viable sequence of bits which the decoder can interpret as a header mark. It may also include special identifying codes (e.g. a Barker sequence code). In addition, the header part 701 may possess some distinguishable physical attributes, such as colors and/or light intensities that differ substantially from those used for the transmission of the other portions of the data packet.

In some embodiments, the header pattern is spatially coded using all the LEDs in an array (or sub-array) so that it can be detected by the receiver using minimum number of video frames. In the example of a nine LED array (as shown in FIG. 7), each block 707 may carry information that is spatially encoded using eight data LEDs #0-#7, wherein LED #8 conveys a clock signal 704 such that together there are nine binary signals (or sub-blocks) 708.

It should be noted that if the spatial position of clock LED 704 is predefined, for instance at center of a 3×3 array, then the receiver device may decode information conveyed by that LED as a clock signal in order to correctly synchronize the other LEDs. Optionally, predefined array templates may be provided, for example for 3×3, 4×4, or linear arrays, wherein the receiver may locate a clock LED, or several clock LEDs, based on the predefined templates. For example, the receiver device identifying an optical tag with a 4×4 LED array, and identifies the clock LED at top left corner. In some embodiments, a calibration may be required between the receiver device and at least one optical tag in order to calibrate the synchronization between the signals.

Header part 701 may include a unique series of bits (e.g. all 1's) that the decoder is instructed to interpret as a header. It may denote the beginning of transmission of the rest of the data packet. In some embodiments, the header may also include a special marker (or anchor) bit(s) 705 ("0" in this example) that indicates the upright orientation of the optical tag. Such markers may be of particular importance in cases where the optical tag is not affixed in position and reconstruction of the original information by the receiver may depend on identifying the correct angular orientation of the optical tag.

In some embodiments, payload part 702 may contain the information of the optical tag, which normally includes a UID 107. Trailer part 703 may consist of administrative information such as a special security code.

According to some embodiments, the optical tag may be pre-configured with at least one unique identifier number (UID) that is permanently stored in a non-volatile memory of the optical tag and is included in the transmission of the data packet(s). Optionally, each data packet may consist of a respective single UID.

Figure 9:
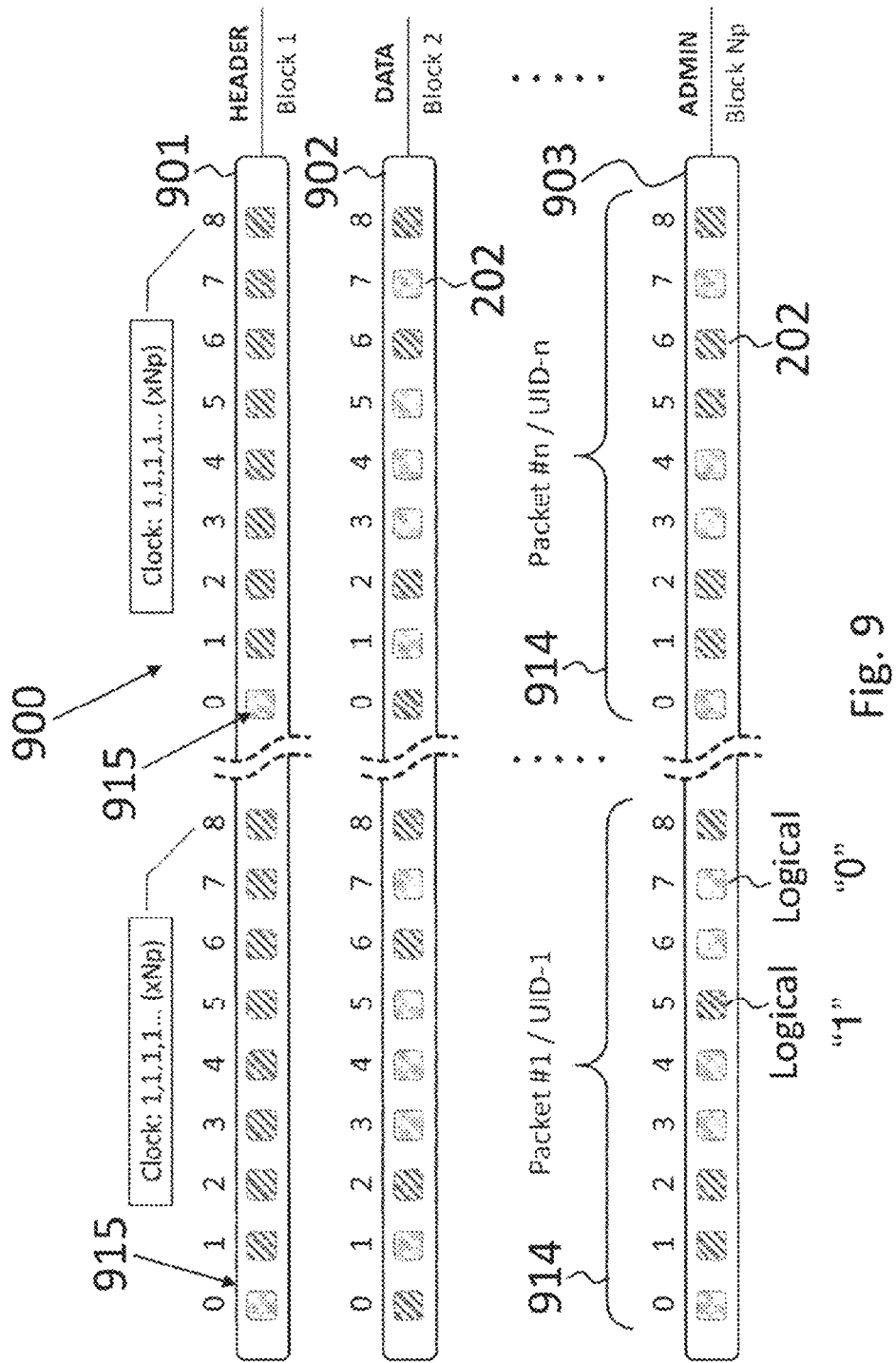
FIG. 9 illustrates a schematic representation of a linear optical tag in which LEDs are arranged along a narrow strip, according to an embodiment of the present invention.

Referring now to FIG. 9, which shows a schematic representation of a linear optical tag 900 in which LEDs 202 are arranged along a narrow strip, according to some embodiments of the invention. It should be noted that each segment 901, 902, . . . , 903 of the tag 900 represents one data block of a total of "Np" blocks that make the data packets. In other words, each segment is the spatial state of a single color channel during different consecutive frame-to-frame periods of a receiver device. It should be noted that FIG. 9 represents a simplified example, whereas in more general cases each data block may be encoded using some multi-color coding scheme.

It is appreciated that LEDs 202 are grouped into several sub-arrays 914, each comprising nine LEDs 202, as an exemplary configuration while any other number of LEDs 202 may also be possible. If sub-arrays 914 are electrically/logically (and/or optically) isolated then each may convey a different data packet that is associated with the general location of that sub-array 914 along the optical tag 900. In particular, different UIDs may be assigned to different sites along the optical tag, making it "linearly addressable".

In some embodiments, LEDs 202 of the linear optical tag may be evenly spaced along its longitudinal axis so there would be a need for a delimiter symbol to allow the reader mobile device to distinguish between adjacent sub-arrays 914. Thus, LED #0 (indicated 915) of each of the sub-arrays 914 may perform as the delimiter symbol by transmitting logical zeros ('0's) in header block 901, which otherwise contains all logical one ('1's). Nonetheless, there may be numerous different methods by which adjacent sub-arrays 914 are differentiated.

According to some embodiments, clock LEDs #8 of all the sub-arrays 914 (e.g. the last in a linear sub array) along the linear optical tag 900 may operate in phase relative to a common clock of the optical tag 900. In some embodiments, the clocks of the sub-arrays 914 may have some phase shift relative to one another, as further described hereinafter.

It is appreciated that with a suitable phase difference, light pulses of adjacent sub-arrays have smaller likelihood of being "partially exposed" (i.e. un-readable) at the same time by the receiver mobile device. This may be useful for error correction in cases where the sub-arrays convey similar or identical information. An additional advantage of introducing the phase differences among sub-arrays 914 may be achieved with variable phase shifts of 0° and 180° between the clocks of adjacent sub-arrays 914 that may be used to convey an additional layer of information at a scale greater than that of the sub-arrays 914. In other words, if clock signals along the linear optical tag are distinctively legible at distances far greater than those of the regular data LEDs 202 (e.g. using several brighter LEDs 202 to convey each clock signal), than multiple in-phase and out-of-phase clock signals may jointly encode a stream of information that is uncorrelated with the information conveyed by the sub-arrays 914 (i.e. the clock LEDs may perform as data LEDs at the higher tier).

Figure 10:
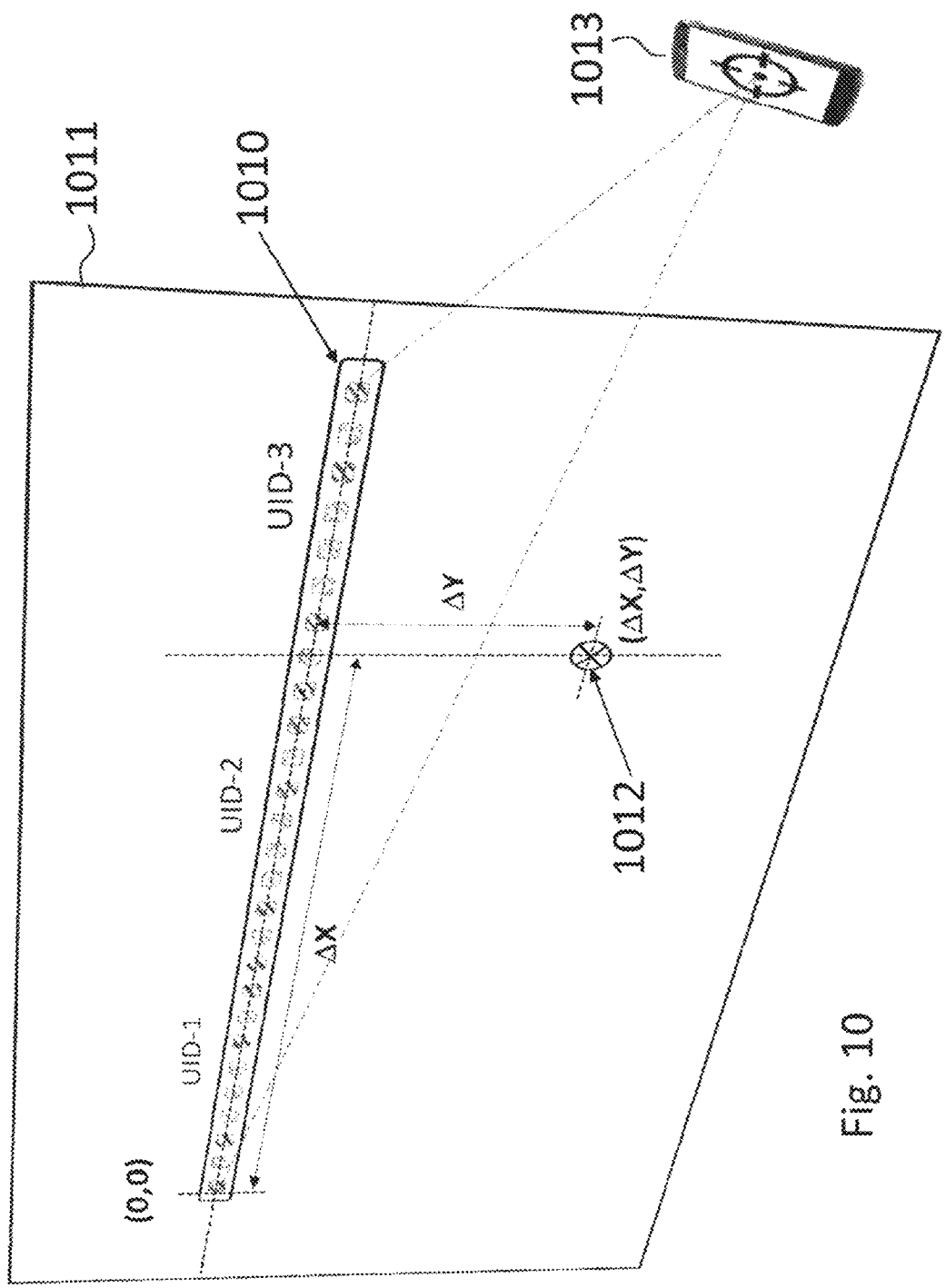
FIG. 10 schematically illustrates linear optical tag used to define a particular plane in space, according to an embodiment of the present invention.

Referring now to FIG. 10, which schematically illustrates linear optical tag 1010 used to define a particular plane 1011 in space and to address different points within that plane, according to some embodiments of the invention. A one-dimensional array may be useful in defining 2D planes in space incorporating the array. In particular, a horizontal LED strip may be constrained to define a vertical or a horizontal plane and a vertical LED strip can define any useful vertical plane.

It should be noted that a dedicated tag reading algorithm of the receiver mobile device may be used to decide which plane among the infinite number of 2D planes, incorporating the tag's axis, to address. In many practical scenarios, however, reference would probably be made to a vertical plane or to a horizontal plane (in the receiver's coordinates).

Further, if linear optical tag 1010 is constrained to define a particular plane 1011 in space, the absolute location assigned to a UID (e.g. that of the clock LED), together with the distance $\Delta Y$ normal to the axis of linear optical tag 1010 may be used to uniquely address any point within that particular 2D plane. Optionally, distances $\Delta Y$ normal to the tag may be measured using the same units used to measure distances along the axis of linear optical tag 1010.

It is appreciated that there are two scales by which distances can be measured along linear optical tag 1010: a coarse scale being the length of the sub-arrays and a fine scale being the LED-to-LED spacing. Since linear optical tag 1010 may transmit multiple data packets using multiple clusters of LEDs (e.g. with sub-arrays), a linear optical tag 1010 may transmit a number of UIDs corresponding to different sites along the axis of the optical tag. Therefore, if the LEDs are uniformly spaced and the sub-arrays have identical lengths, then the UIDs may mark regularly spaced intervals along the axis of linear optical tag 1010. As sub-arrays typically convey UIDs, the coarse scale essentially may refer to the distance between tangible points designated by UIDs.

In some embodiments, the scale used for the axial direction $\Delta X$ may also be used to measure distances $\Delta Y$ perpendicular to the axis of linear optical tag 1010, in the pre-defined plane 1011. If, for example, the origin of the 2D plane is set at the left end of linear optical tag 1010, indicated as (0,0), then a general point 1012 below or above the axis may be assigned using the vector $[\Delta x, \Delta y]$ measured from the origin. Similarly, one may measure distances $\Delta z$ perpendicular to plane 1011 and address a general point in 3D space using the vector $[\Delta x, \Delta y, \Delta z]$ measured from the origin.

If a receiver mobile device 1013 is arbitrarily positioned with its image reading means (e.g. a camera) facing linear optical tag 1010, then it may capture some perspective projection of linear optical tag 1010. Knowing the actual spacing of the LEDs (based on the tag's UIDs), it may be possible to measure the distribution of LED impressions (in pixels) on the image sensor of the receiver mobile device 1013, and then use this information to calculate the location and the orientation of linear optical tag 1010 relative to receiver mobile device 1013. If further the absolute location and orientation of linear optical tag 1010 are made available to the receiver mobile device 1013 (e.g. from server having UIDs data) then the receiver may be able to calculate its own absolute location. It is appreciated that the precision at which receiver mobile device's 1013 position may be determined depends on many factors. However, accuracy may improve if two or more linear optical tags, having different orientation in space, are captured and processed together.

In some embodiments, the optical tag(s) may be utilized as mechanism to infer position, wherein the receiver may infer its own position relative to the known location of the optical tag(s). Optionally, at least one optical tag may be utilized to implement an indoor positioning mechanism (in contrast to outdoor positioning that is based on external satellite positioning for instance), wherein the receiver may infer its own position relative to the known location of the optical tag(s).

Figure 11:
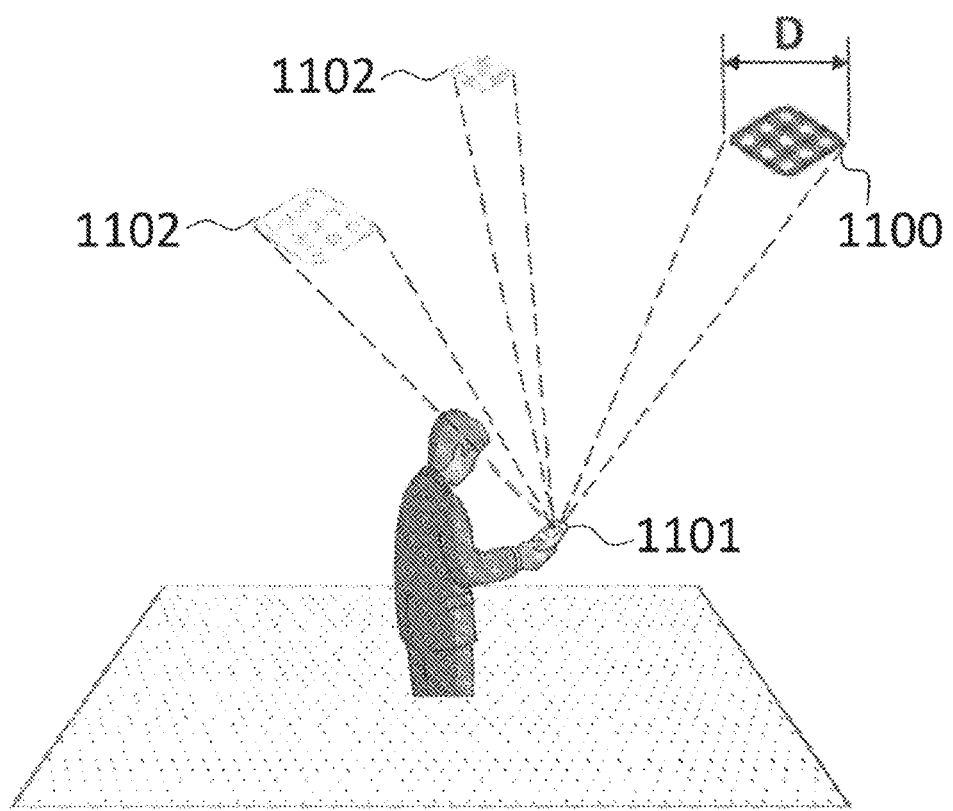
FIG. 11 schematically illustrates a localized optical tag used to determine the position of the receiver device, according to an embodiment of the present invention.

Referring now to FIG. 11, which schematically illustrates a localized optical tag 1100 (having square LED matrix in this example) used to determine the position of the receiver device 1101, in a manner similar to the linear optical tag, according to some embodiments of the invention.

It is appreciated that knowing the actual geometry of the LEDs array, it may be possible to measure the distribution of LED impressions on the image sensor of the receiver mobile device 1101 and use this information to trace the position of optical tag 1100 in the receiver mobile device's 1101 coordinates based on geometrical perspective considerations. If further the absolute location and angular orientation of optical tag 1100 (for example known size 'D') are made available to the receiver mobile device 1101 then the receiver may be able to calculate its own absolute location. Here again, the accuracy at which the mobile device's 1101 location may be determined, may improve if two or more optical tags 1102 are captured and processed at the same time, wherein the optical tag's characteristic may be known from a server based on UIDs of the optical tag(s).

In some embodiments, RGB channels of at least one LED of the optical tag do not convey machine-readable information. Such channels rather serve decorative aspects of the tag or convey messages legible to human observers. For example, a flashing LED(s) may indicate that the information of the optical tag has been changed.

Notwithstanding, RGB channels of the optical tag that convey machine-readable information may also serve decorative aspects and/or branding aspects of the tag, or they can convey messages legible to human observers. For example, clock LEDs may use a color scheme different than that of data LEDs. and thereby contributing to a characteristic visual pattern of the optical tag.

Referring again to data packets of the transmission protocol (for instance as shown in FIGS. 7 and 9), for each data packet transmitted by the optical tag, at least one color channel of at least one LED transmits a clock signal (i.e. the clock LED). The clock signal may comprise a sequence of regularly spaced pulses of light. Namely, each clock period has a pulse of light ('1') followed by absence of light ('0'), with the transition occurring at midpoint of the period. A method for a clock-less transmission is further described hereinafter.

According to some embodiments, LEDs in the array (or sub-array) that do not convey clock signals (i.e. the data LEDs), are slaved to a corresponding clock signal. These LEDs may convey binary data that are phase encoded (or Manchester coded) using the clock signal. According to this scheme, every bit to be transmitted may be represented by a combination of a pulse ('1') and an absence of a pulse ('0') according to a coding convention such as described in "Table 1":

TABLE 1

| Data | Clock | Transmitted |
|---|---|---|
| Logical 0 | 1 | 0 |
|  | 0 | 1 |
| Logical 1 | 1 | 1 |
|  | 0 | 0 |

Such coding may increase the perceived pulse frequency when transmitting arbitrary sequence of bits since there is a light pulse associated with both logical '1' and logical '0'. This coding scheme may therefore be useful in mitigating the visible flicker due to the low-frequency optical carrier.

To recover the information of the optical tag, the receiver device may correlate each temporal bit stream it detects with the corresponding clock signal. Since all bit streams had been originally phase encoded using that clock signal, they may now be decoded by reversing the scheme used for the encoding (e.g. that of "Table 1").

Figure 12:
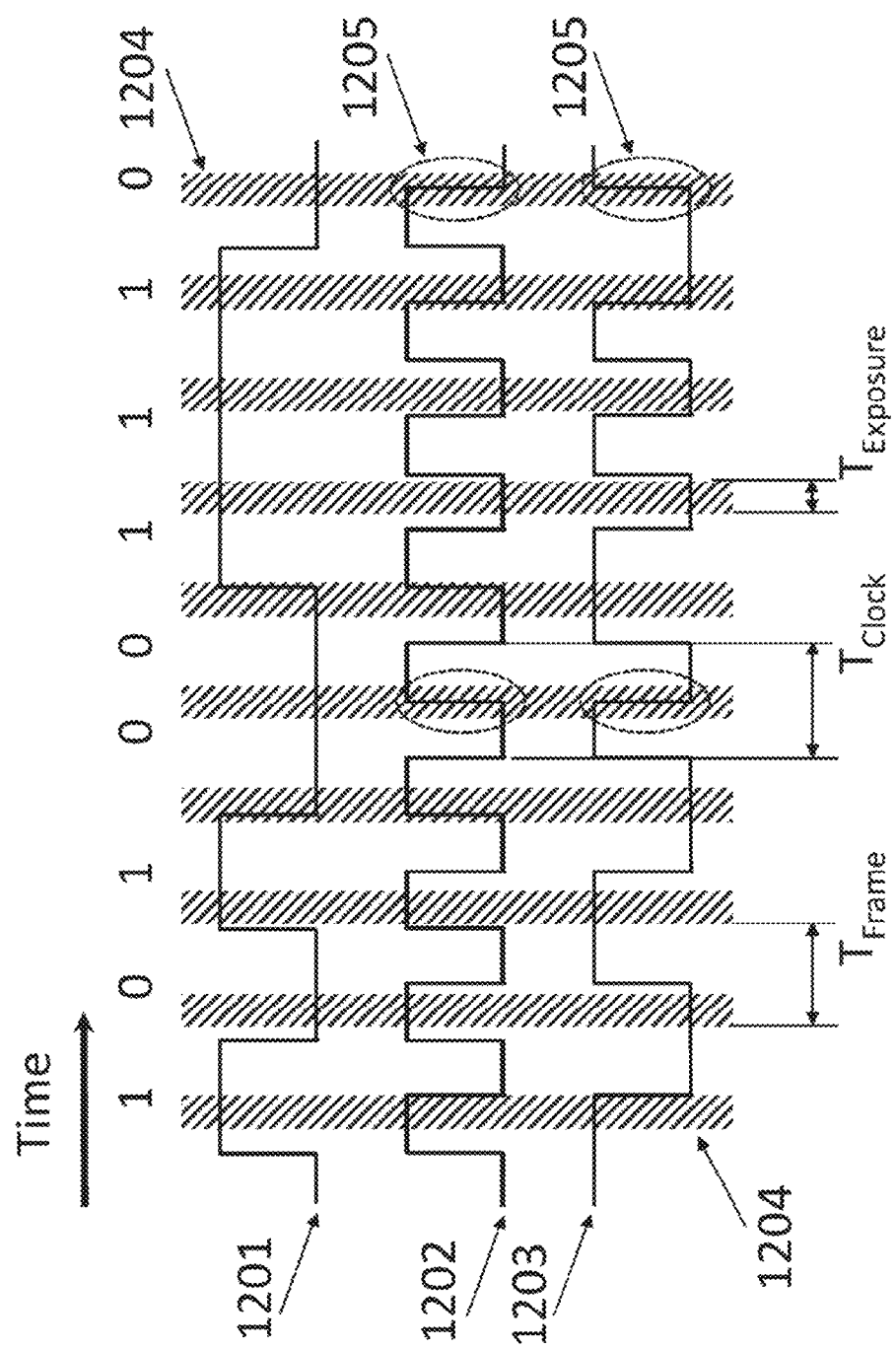
FIG. 12 schematically illustrates basic encoding of a temporal bit sequence at the transmitter and an encoded signal negotiated by the receiver, according to an embodiment of the present invention.

Referring now to FIG. 12, which schematically illustrates basic encoding scheme of a temporal bit sequence at the transmitter and an encoded signal negotiated by the receiver, according to some embodiments of the invention. Optionally, on-off keying (OOK) may be used to modulate the optical carrier. The original data signal 1201 may be phase (or Manchester) coded using the clock signal 1202 in order to obtain the encoded signal 1203.

At the receiver device, the phase coded signal may be regularly sampled by the sequence of video frames 1204, using exposure times (indicated "TExposure"). In some embodiments, the clock period (indicated "TClock"), or some integer multiple thereof, of the transmitter's clock signal 1202 may be set to be marginally longer than the frame-to-frame time interval (indicated "TFrame") of a camera by a factor $\Delta$, such that TClock=TFrame+$\Delta$. This difference in repetition rates between the transmitter and the receiver may cause a steady phase drift that prevents phase locking of the two clocks (i.e. of transmitter and receiver).

It should be noted that since the frame acquisition is not always synchronized with the incoming data signal, occasionally some frames 1204 may capture light pulses undergoing transition from '1' to '0' or vice versa (indicated as 1205). Such pulses may be referred to as "partially exposed". In a single channel transmission, partially exposed pulse images are typically smaller and less bright than their fully exposed counterparts.

It is appreciated that the exposure time "TExposure" may be a key design parameter, which may be optimized for best overall performance. On the one hand, the exposure should be short to minimize reading errors due to ambiguous pulse exposures. On the other hand, the exposure should be long to allow the image sensor to accumulate sufficient light and record distinctive pulse images. In some embodiments, exposures longer than about ¼ of the clock period "TClock" of the optical tag may contribute to unacceptably low signal-to-noise ratio.

Figure 13:
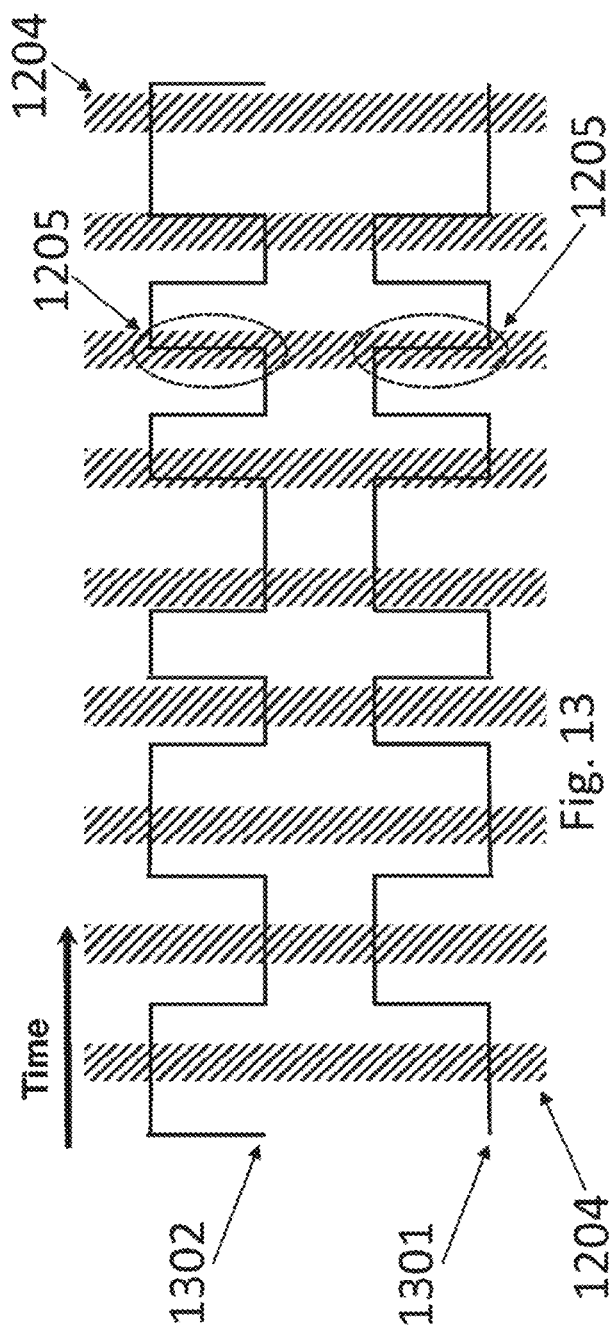
FIG. 13 schematically illustrates a temporal bit sequence transmitted using two complementary color channels of a single RGB LED, according to an embodiment of the present invention.

Referring now to FIG. 13, which schematically illustrates a temporal bit sequence transmitted using two complementary color channels of a single RGB LED, according to some embodiments of the invention. It should be noted that the minor signal 1301 is the inverse (binary ones' complement) of the major phase coded signal 1302.

Since every pulse of one color (e.g. with minor signal 1301) is always followed by a pulse of the second color (e.g. with major signal 1302), and since the frequency of the carrier signal is normally set beyond the color-fusion threshold of the human eye, an observer may perceive LED color which is the chromatic combination of the major color and the minor color. It is appreciated that the use of two complementary color channels may reduce the visible flicker associated with the low-frequency transmission compared to a single channel transmission.

At the receiver, most image exposures 1204 record either light pulses of the major color or light pulses of the minor color. However, frame exposures 1204 occurring during pulse transitions 1205 may integrate some light of the major color and some light of the minor color, resulting in LED images (or partial area thereof) that have normal brightness and color which is a mix of the major and the minor colors.

Figure 14:
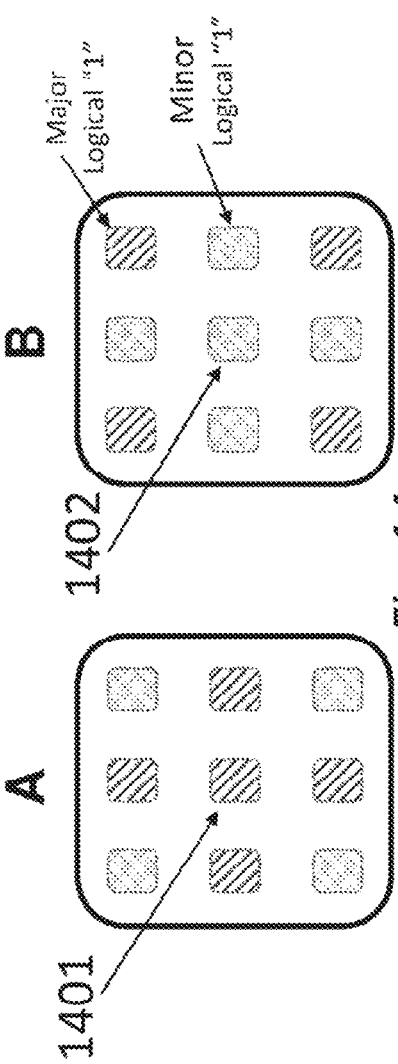
FIG. 14 schematically illustrates two possible manifestations of a fully exposed data block when using the complementary channels scheme, according to an embodiment of the present invention.

Referring now to FIG. 14, which schematically illustrates two possible manifestations of a fully exposed data block when using the complementary channels scheme, according to some embodiments of the invention.

It should be noted that segment 'A' depicts the case in which frame exposure 1204 takes place during a pulse of the major clock 1401, for instance located at the center of a 3×3 LED array of the optical tag. Segment 'B' depicts the case where the same data block is exposed during a pulse of the minor clock 1402. It is appreciated that in order to determine the actual bit values of a data block, the receiver device must first evaluate the state of the corresponding clock.

According to some embodiments, in order to confine optical flicker to a level hardly noticeable by people, the pulse frequency of the modulated light must be above a level generally known as the "flicker fusion threshold" of the human eye. While this threshold depends on various objective and subjective factors, it is commonly accepted that most people perceive monotonic oscillations of light as uniform illumination starting at frequencies around 30 Hertz.

Evidently, a clock rate of 30 periods per second may be insufficient to eliminate flicker of real-world transmissions since arbitrary phase (or Manchester) coded bit sequences exhibit low frequency content, wherein the data sequence 1, 0, 1, 0, 1, 0 . . . , for example, may appear at half the clock frequency. In some embodiments, to effectively mitigate flicker for arbitrary binary sequences, the transmitter's clock rate should be 60 Hz or higher. This means that at least two clock cycles would elapse during a single frame-to-frame time interval of a receiver camera operating at 30 frames per second (fps). Hence, the incoming signal may be undersampled by the receiver device.

According to some embodiments, the clock rate of the optical tag may be set to be some integer multiple of the receiver device's frame rate (optionally, with a small perturbation, as further described hereinafter). Then, to avoid bit losses, each coded symbol may be transmitted repeatedly for the number of clock cycles occurring during a single frame-to-frame interval of the receiver device (e.g. at 90 Hz each bit may be repeated three times).

According to some embodiments, the visible flicker created by low carrier frequency may be further reduced by using "redundant" signals. Optionally, a minor ("redundant") color channel, carrying the inverse version (i.e. binary ones' complement) of a major coded signal may be conveyed alongside the major channel by the same LED.

Consequently, every pulse of a first color channel may be complemented by an absence of pulse of the second color channel, and vice versa. If the transitions take place at a rate beyond the "color fusion" threshold of the human eye, an observer may see LED color which is the chromatic combination of the major and the minor colors, regardless of the order in which the pulses are introduced. Given the clock frequency, for every pair of major and minor colors there would be a certain ratio of illumination intensities that minimizes the perceived flicker.

Figure 15:
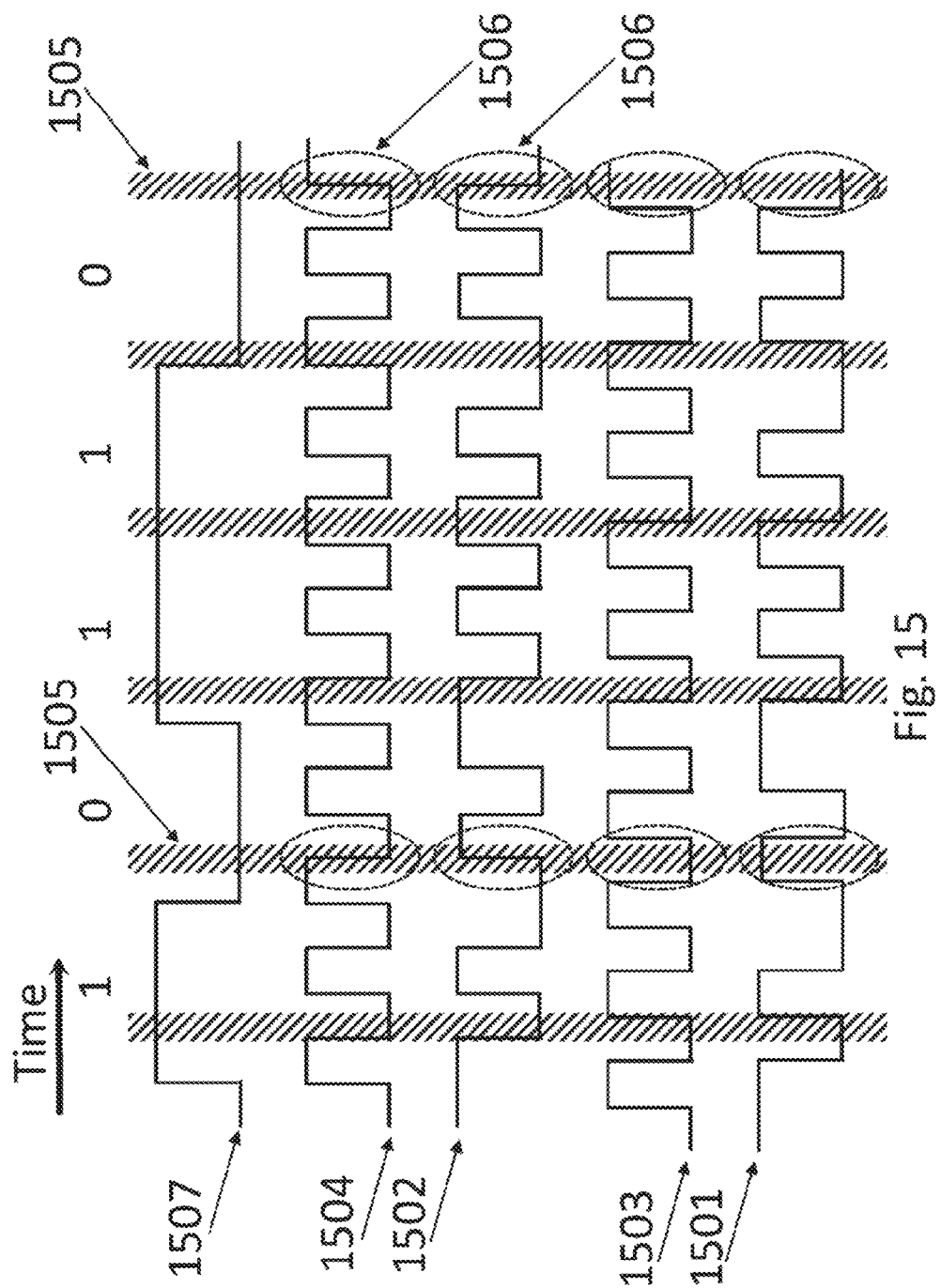
FIG. 15 schematically illustrates a temporal bit sequence transmitted using a redundant, phase-shifted, color channel, according to an embodiment of the present invention.

Referring now to FIG. 15, which schematically illustrates a temporal bit sequence transmitted using a redundant, phase-shifted, color channel, according to some embodiments of the invention. It should be noted that the clock rate of the optical tag may be roughly twice the frame rate of the receiver device (e.g. of the camera), and therefore each bit symbol may be repeated two times. This particular clock rate is selected merely for the simplicity of demonstration. Optionally, such a rate may be too low for preventing visible flicker. Flicker-less transmission is typically achievable at actual clock rates that are quadruple the frame rate of commercially available mobile cameras (e.g. at ~120 Hz), and higher multiples thereof.

A minor data signal 1501 (as 1st color channel), has a corresponding shape as a major phase coded signal 1502 (as 2nd color channel), with a phase shift of about 90 degrees relative thereto. Similarly, a minor clock signal 1503 has a phase shift of about 90 degrees relative to the major clock signal 1504. Optionally, any phase shift smaller than 90° may be used with a minor channel, as long as the time equivalent of that phase shift is equal to or greater than the exposure time of the receiver device's camera. It should be noted that signal 1507 depicts the original bit sequence that has been phase coded using major clock signal 1504 to generate major data signal 1502.

Such redundant minor channels may be utilized when a video frame 1505 is partially exposed by the major signals 1502, 1504, wherein it is also fully exposed by the minor signals 1501, 1503. In such cases, the receiver may revert to decoding the minor signal 1504 and thus overcome the ambiguity related to the direction of the pulse transition 1506 of major data signal 1502.

According to some embodiments, the major channel and the minor channel have identical colors. However, pulse intensities of the one channel are considerably lower than the pulse intensities of the second channel, so that the receiver may distinguish them as different data channels.

In a more elaborate scheme, two or three primary (RGB) colors may serve as two or three non-overlapping major channels. For each major color, the two remaining primary colors, comprising the "white-complement" of that color (since the combination of all three colors may create the white color), serve as the inverted (i.e. binary ones' complement) minor channel, as further described hereinafter.

It has been found that the modulation scheme comprising pairs of complementary phase coded channels only reduces flicker to an acceptable level at relatively high clock rates, usually too high to maintain low counts of partially exposed video frames.

Hence, flicker may further be decreased by applying transformation to all color channels of the optical tag. For each clock channel, even-numbered cycles may be replaces by their inverse form (binary ones' complement). Tat is, the ordinary sequence 1, 0, 1, 0, 1, 0, . . . , now becomes 1, 1, 0, 0, 1, 1, 0, 0, . . . having half the pulse frequency of the original sequence. Odd-numbered cycles are left intact. Similarly, data channels may be transformed in the same manner as their corresponding clock channels. Namely, even-numbered cycles are replaced by their inverse form, and odd-numbered cycles are left intact.

Since temporal bit sequences are generally phase coded using their corresponding clock signal(s), applying identical transformation to both the data signal and the clock signal may not affect the information carried by the data signal. The above described transformation (henceforth called "even-cycle-inverse transform") may be effective in reducing flicker because it may eliminate much of the low-frequency content that is associated with arbitrary bit transitions. A transformed signal goes through higher (double) frequency phases during bit changes, while the original signal undergoes low frequency phases.

According to some embodiments, the visible flicker due to low carrier frequency may be further reduced using some phase cancellation scheme. Namely, light intensities are adjusted for each pulse in each color channel so as to compensate for low-frequency content that is associated with the phase coded bit streams.

Figure 16:
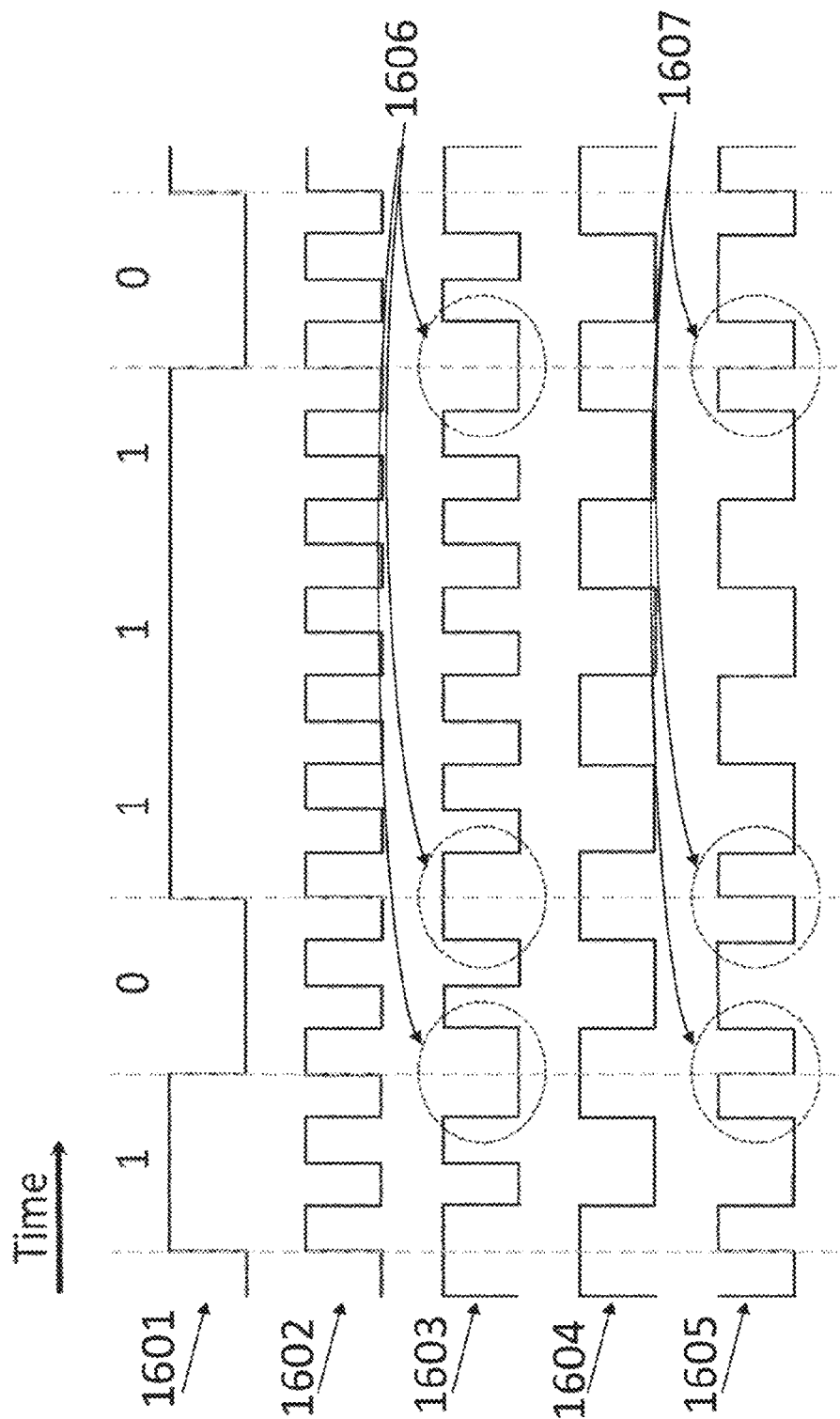
FIG. 16 schematically illustrates even-cycle-inverse transformation and its contribution to flicker alleviation, according to an embodiment of the present invention.

Referring now to FIG. 16, which schematically illustrates even-cycle-inverse transformation and its contribution to flicker alleviation, according to some embodiments of the invention. It should be noted that bit sequence 1601 is first phase coded using ordinary clock signal 1602 (e.g. at nearly twice the frequency of the receiver device) to produce the ordinary phase coded signal 1603. Even-cycle-inverse transformation may then be applied to the clock signal 1602 and to the data signal 1603 to produce the transformed clock signal 1604 and the transformed data signal 1605.

This may be executed by concurrently inverting (binary ones' complement) every second cycle of both the data and the clock signals. Specifically, starting at a raising edge of clock pulse, for every second cycle, a pulse ('1') may be substituted by absence of a pulse ('0') and vice versa. Since the data signal and the corresponding clock signal are transformed in just the same manner, the information carried by the transformed data signal may remain unaffected, as long as it is decoded using the transformed clock signal.

It should be noted that the transformed clock signal 1604 may now have double the pulse width (and half the frequency) of the original clock signal 1602. Similarly, the "dominant" pulse width of the transformed data signal 1605 may also be doubled, wherein arbitrary bit streams have a dominant frequency due to bit repetitions. At the same time, bit transitions ('0' to '1' and vice versa) that originally involved pulse widths twice the dominant width 1606, may now involve pulses that are half the dominant width 1607. It is appreciated that when applying the even-cycle-inverse transform, the underlying clock frequency of the transmitter, and the corresponding number of bit repetitions, may be doubled in order to restore flicker-less transmission.

There may be a positive aspect and a negative aspect to applying the even-cycle-inverse transform in conjunction with an increase in clock frequency. The positive outcome is a reduction in visible flicker owing to the removal of low frequency content associated with random bit transitions. The negative outcome is a moderate increase (on average) in ambiguous pulse readings due to higher count of pulse transitions per transmitted symbols in the transformed signal.

According to some embodiments, the optical tag may be more efficient if clock LEDs are spared and the information of the optical tag is transmitted using data LEDs alone. This is particularly the case when the array(s) of the optical tag comprise a small number of LEDs (therefore the transmission overhead is high). The general encoding scheme disclosed herein uses clock signals merely to resolve the "polarity" (180 phase) ambiguity of the phase (or Manchester) coded signals at the receiver side. Clock-less transmission avoids the polarity question by employing differential coding, which ignores absolute bit values and focus on bit transitions.

Essentially, differential coding may be implemented such that every bit of the encoded sequence is the sum (binary addition) of a preceding bit of the encoded sequence and the current bit of the original sequence. Namely, if xi is a bit intended for transmission, and yi is the bit actually transmitted, then $yi=y(i-1)\oplus xi$. The differentially encoded signal may then be transmitted by the optical tag using any of the methods disclosed herein for non-differential signals.

At the receiver side, recovery of the differentially encoded signal may commence in the same manner as for non-differential signals. However, instead of decoding the original bit sequence through correlation with a clock, it may decoded by reversing the differential coding process. That is, each bit value xi of the original bit sequence may be reconstructed by subtracting the corresponding bit yi of the differentially encoded signal from the preceding bit $y(i-1)$, so that: $xi=yi\oplus y(i-1)$.

The benefits of clock-less transmission may come with a penalty of extra effort needed for error corrections. Any error detected during reception (e.g. due to partially exposed light pulses) may affect the decoding of two consecutive bits, as opposed to one bit in the non-differential case.

Figure 17:
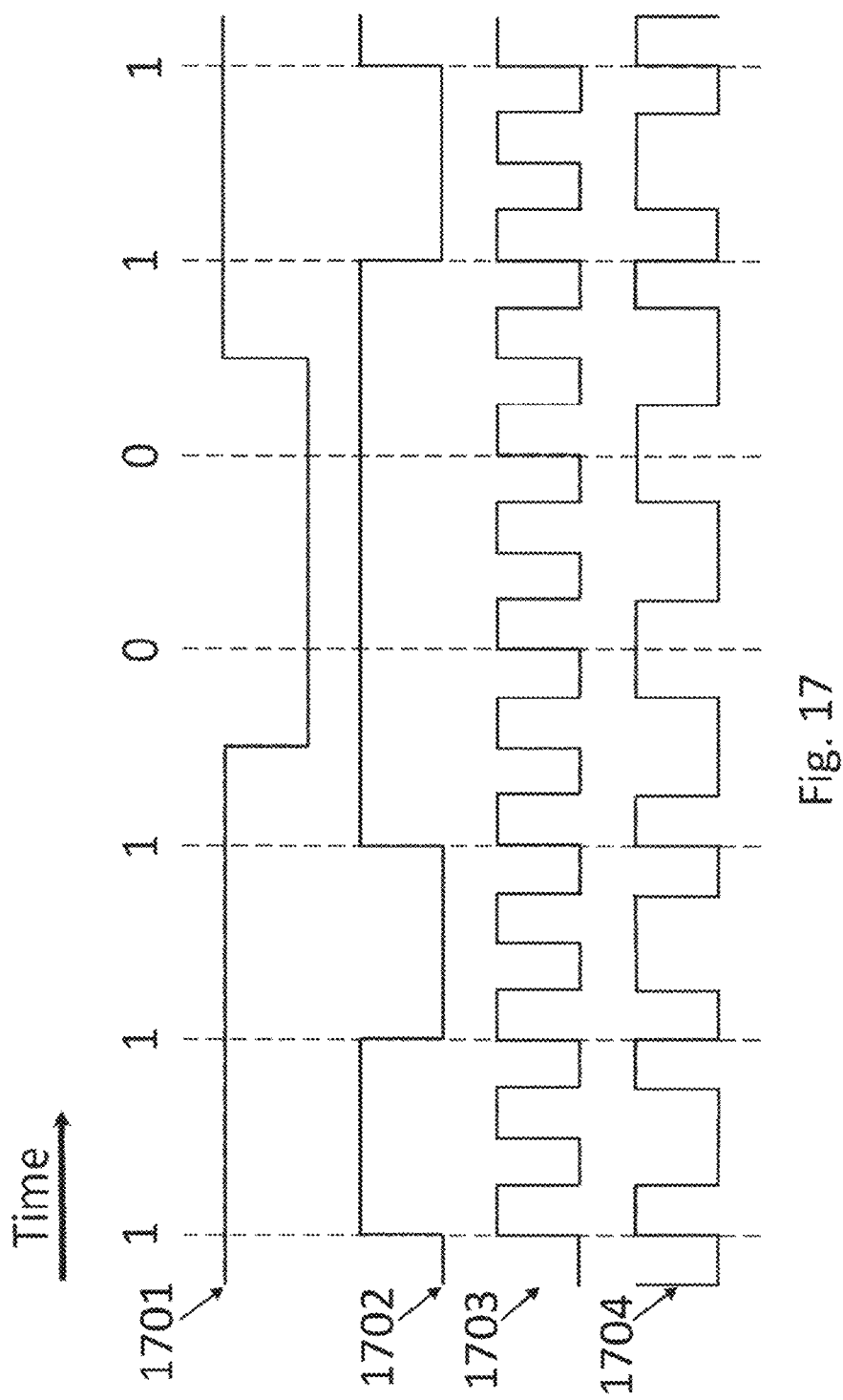
FIG. 17 schematically illustrates a bit sequence conveyed by a single data channel is encoded using differential coding in a clock-less transmission, according to an embodiment of the present invention.

Referring now to FIG. 17, which schematically illustrates a bit sequence conveyed by a single data channel that is encoded using differential coding in a clock-less transmission, according to some embodiments of the invention. It is appreciated that the original bit sequence 1701 may be transformed such that bit transitions of the differentially encoded bit sequence 1702 represent logical '1's of the original bit sequence and no transitions represent logical '0's. Next, the encoded signal 1702 may be phase coded using the ordinary clock signal 1703. It may then undergo even-cycle-inverse transform in order to attain the signal actually transmitted 1704.

Figure 18:
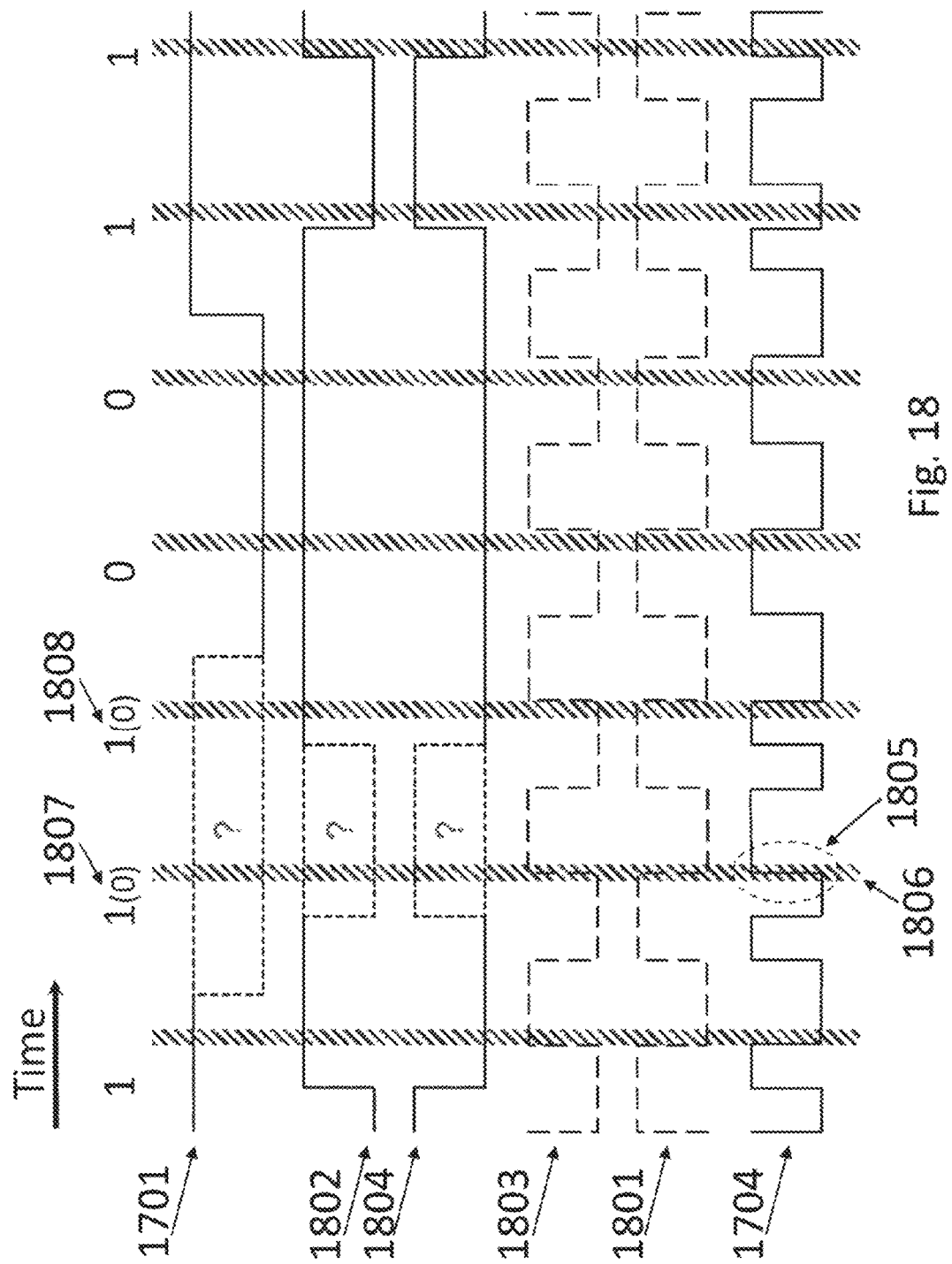
FIG. 18 schematically illustrates a bit sequence conveyed using differential coding in a clock-less transmission is recovered at the receiver side, according to an embodiment of the present invention.

Referring now to FIG. 18, which schematically illustrates a bit sequence conveyed using differential coding in a clock-less transmission that is recovered at the receiver side, according to some embodiments of the invention.

Referring to the example of FIG. 17, the phase (or Manchester) coded signal 1704 may now be detected by the receiver device (e.g. by the camera). It is appreciated that in absence of a clock signal in the transmission, the decoder is unable to establish the "polarity" of the received signal (180° phase ambiguity). If the virtual clock signal 1801 is used for the decoding, the signal 1802 may be recovered, and if the inverted clock signal 1803 is used, the signal 1804 may be recovered. The virtue of differential coding becomes clear noting that it does not matter which signal, 1802 or 1804, is eventually processed. Deferential decoding of both signals yields the same original bit sequence 1701.

The effect of invalid pulse readings on the decoding of differentially coded signals may be understood by inspecting the ambiguity 1805 associated with video frame 1806. When decoding the incoming signal 1704 the ambiguity 1805 may lead to an unresolved bit value in the interchangeable, differentially coded, signals 1802 and 1804 (marked with '?'). Since this bit may be used in both a backward and a forward difference calculations during restoration of the original bit sequence 1701, there are ultimately two unresolved bits 1807 and 1808 in the recovered bit sequence.

In some embodiments, the unidirectional communication between the optical tag and the camera-based tag reader makes it impossible to synchronize the clocks of the two devices. If the clock rate of the transmitter is forced to match (or be very close to) the clock rate of the receiver device, or any integer multiple thereof, the receiver might occasionally be locked capturing only partially exposed frames.

According to some embodiments, the clock rate of the transmitter may be forced to match the frame rate of the receiver device, or an integer multiple thereof. Phase lock situations may then be detected by the receiver's algorithm that may, upon detection of a problem, ignore the bad video sequence and instruct the receiver's camera to capture a new sequence of at least Np video frames. Since the timing of the new data acquisition may be arbitrary, the new video sequence has a good chance of capturing a complete set of fully exposed pulse image that may be used to reconstruct a valid data packet.

According to some embodiments, phase lock situations may be avoided by deliberately setting the clock of the optical tag to be marginally slower than designated "harmonic" of the receiver's frame rate. In other words, if the nominal clock period "TClock" is selected to be 1/nth of the frame-to-frame interval "TFrame" (for instance as shown in FIG. 12), than the actual clock period would be $Klock_{ac}=TFrame/n+\Delta$, where $\Delta<\frac{1}{2}$ TClock is a time shift.

This frequency perturbation may result in a steady drift of the phase difference (at a rate that depends on A) between the two clocks, which periodically may cause some of the video frames to include partially exposed pulses. If two complementary color channels are transmitted by an RGB LED, then the color of the partially exposed LED projection may be some chromatic combination of the two colors. Optionally, partially exposed pulse images may not be decoded because information regarding the direction of pulse transition had been practically lost.

According to some embodiments, this type of receiver-induced errors may be mitigated by setting the exposure time of the camera "TExposure" to be a fraction of the transmitter's clock period. Specifically, the exposure time may be set to be a of the clock period or smaller. This may ensure that there are more frames capturing either light pulses ('1's) or absence of pulses ('0's) than frames with partial exposures.

According to some embodiments, ambiguously exposed video frames may be dropped (or ignored) during processing, and replaced by equivalent frames from a following, or a preceding sets of "Np" consecutive frames containing other instances of the same data packets. Alternatively, only part of the LED images captured in a frame are partially exposed, for instance when the optical tag is read from a short distance, and rolling shutter effects of image sensors become apparent. Then dedicated tag reading algorithm of the receiver mobile device may process ambiguous LED images through the general error-correction mechanism of the transmission protocol.

Figure 19:
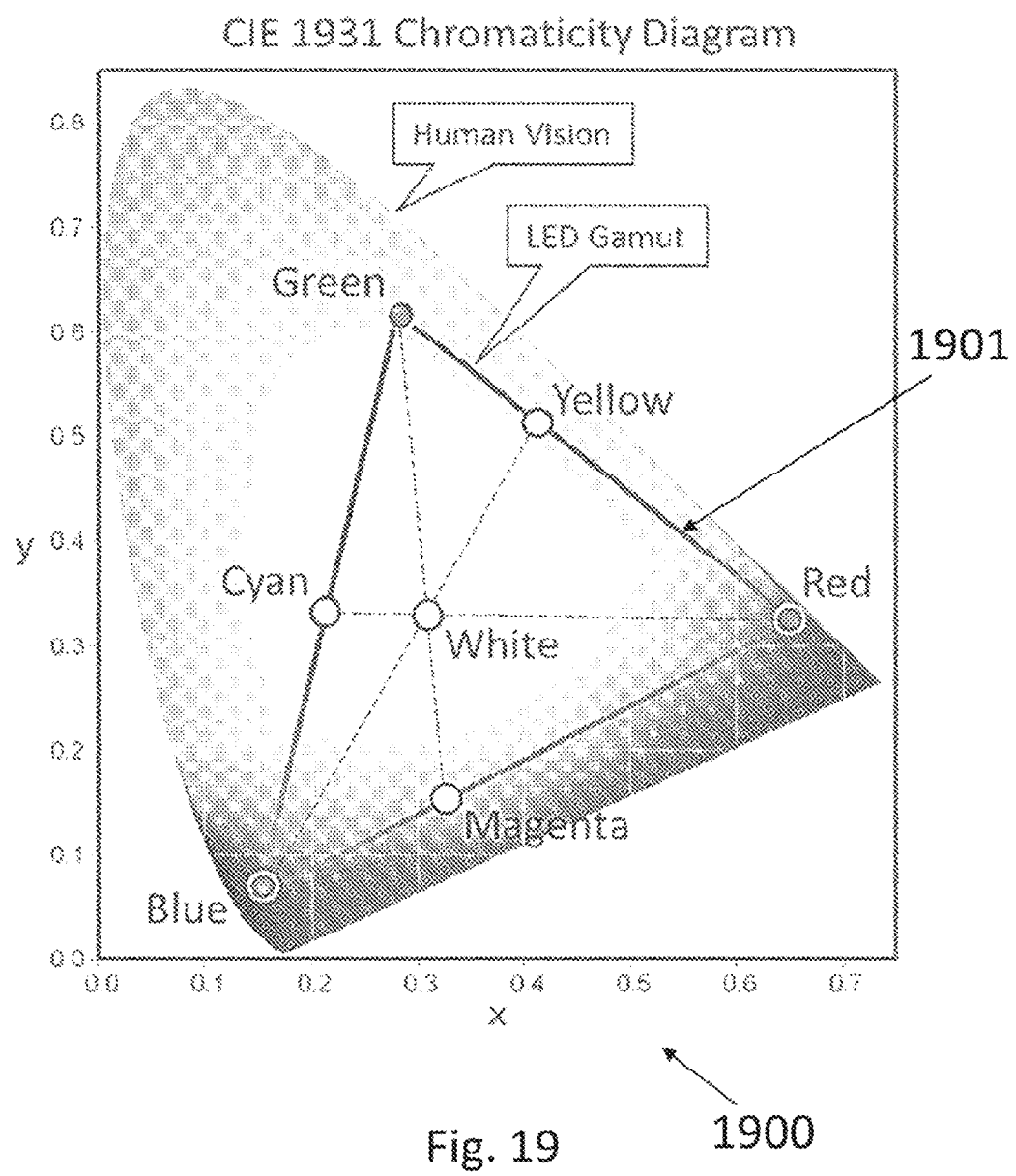
FIG. 19 illustrates complementary pairs of colors as means of reducing the flicker associated with the low-frequency carrier, according to an embodiment of the present invention.

Referring now to FIG. 19, which illustrates complementary pairs of colors as means of reducing the flicker associated with the low-frequency carrier, according to some embodiments of the invention. The color space (gamut) of an RGB LED on the CIE 1931 Chromaticity Chart 1900 is defined by the triangle 1901, the vertices of which correspond to the three primary colors: Red, Green and Blue. In a basic implementation, the LED may convey a single data stream using two primary colors. A major color channel conveys the phase (or Manchester) coded bit sequence. A minor, redundant, color channel may convey the inverse form (binary ones' complement) of the major signal, such that each pulse of the minor signal may be aligned with an absence of a pulse of the major signal, and vice versa. Hence, the three possible pairs of pure major color and pure minor color are: Red & Green. Red & Blue and Green & Blue. In each case, a human observer may perceive LED illumination which is the chromatic combination of the corresponding color pair Yellow, Magenta and Cyan, provided that the clock rate of the tag is beyond the color-fusion threshold of the human eye.

It is appreciated that the major and the minor channels are not restricted to using pure RGB colors. For each channel, a mixed color can be used comprising two or three overlapping primary colors of different relative intensities. Placing the major color and the minor color on the CIE Chart, it may be possible to locate the perceived color at a midpoint of the vector connecting the two colors.

Although any pure or mixed color may be chosen for the major and for the minor colors, the contrast between the two colors (i.e. the Euclidian distance on the CIE Chart) should be sufficiently large so that the channels may be sufficiently uniquely detectable by the receiver device at operating conditions.

For example, a pulse of the primary color Red may be complemented by the color Cyan which is the combination of Green and Blue. If for each major color the intensities of said two remaining primary colors are properly calibrated, then the combined emissions of the RGB LED may be perceived by a human observer as pure white (or at least some level of gray), at high enough pulse rates. Altogether, such a scheme may allow for six different symbols (i.e. Red & Cyan, Blue & Yellow, Gren & Magenta) to be transmitted by an RGB LED. Thus, each LED may convey up to 2.585 (=log[6]/log[2]) binary bits of information during a single frame-to-frame time interval of the receiver. This value may be compared to 3.0 binary bits per cycle that may be conveyed by an RGB LED, using unconstrained OOK modulation.

It should be noted that the complementary major and minor channels are not limited to using the three primary RGB colors. In fact, any number of pure or mixed colors (combinations of different intensity levels of the RGB colors) may be used to transmit a major signal, as long as for each major color there exists a pure color, or a mixed color, that is the white-complements of this major color, to be used as the minor signal. Such pairs of colors are generally known in the art as metameric matches of the color white.

According to some embodiments, the basic scheme of complementary color pairs may be further extended such that multiple pairs of major and minor color channels may be used to convey multiple streams of information per LED emitter. The requirement for minimum flicker may dictate that all pairs of major and minor colors that are used would be "metameric matches" of the same color. That is, all color pairs may yield the same perceived color when displayed sequentially at clock rates beyond the color-fusion threshold of the human eye.

Evidently, a most valuable color-pair system is the one having perceived color of White. This system employs the three primary RGB colors as the major colors, and their respective white-complements as the minor colors. Hence, the color pairs used are: Red & Cyan, Blue & Yellow, Green & Magenta. The white-complement colors reside on the edges of the gamut chart of the LED opposite to the corresponding primary color. Therefore, this system may have the highest possible contrast. The three color-pairs may convey up to six symbols per RGB LED, compared to eight symbols in the case of the three unconstrained RGB colors.

It is appreciated that various pairs of major and minor colors may be used to create a combined (perceived) color other than white. Nevertheless, the number of metameric matches for colors different than white drops significantly as the perceived color diverges from the center of the CIE color space of an LED. Furthermore, even with perceived whitish colors there is a limit to the number of color pairs that can be used with the LEDs of the optical tag due to the requirement for significant contrast between the major and the minor colors and among the pairs themselves. One would generally wish to maximize the Euclidean distances in the CIE color space among all the colors used to make it easier for the receiver to discriminate them as different data channels in real-world conditions.

Figure 20:
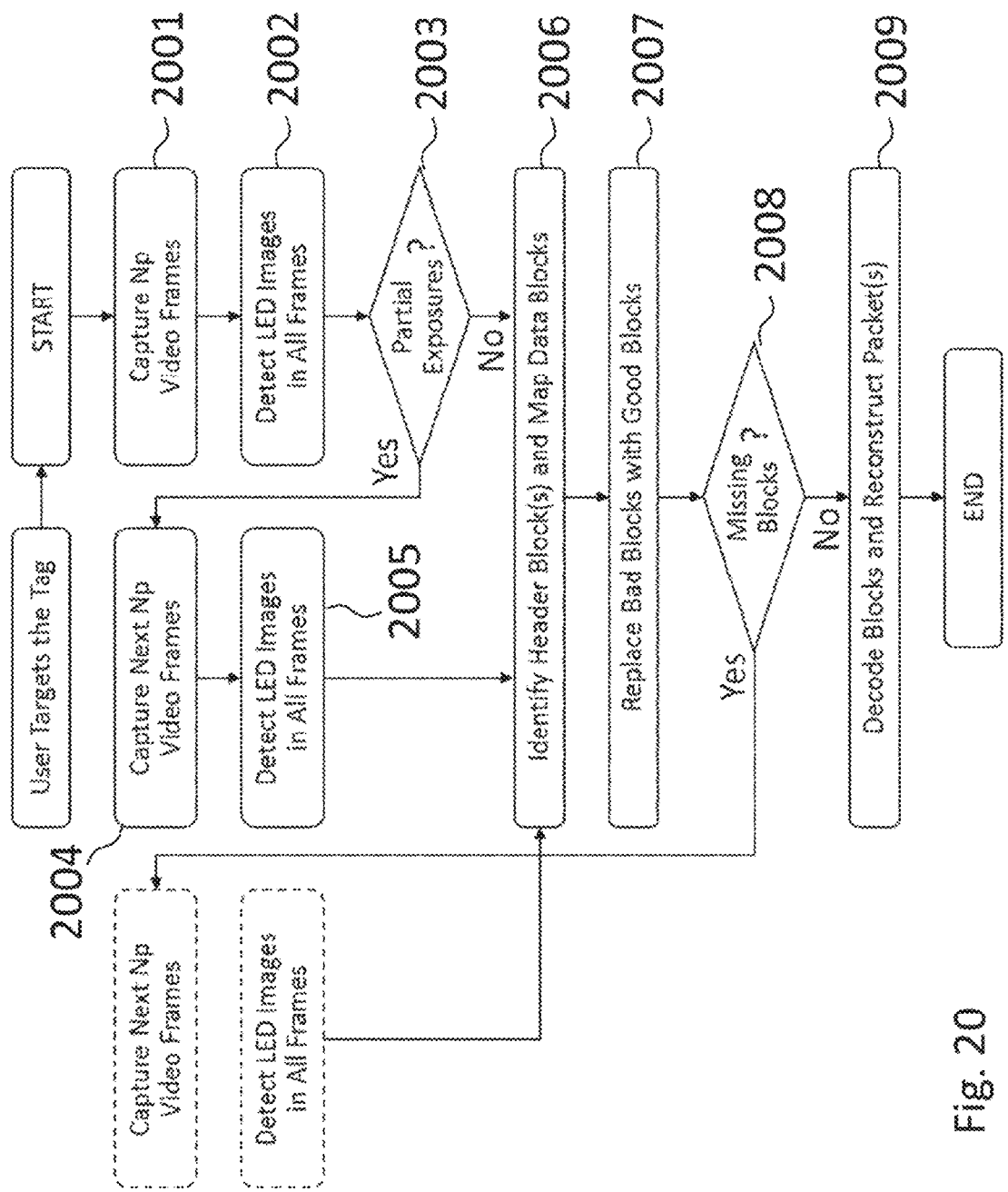
FIG. 20 shows a block diagram of the basic procedure a receiver uses when decoding tag transmissions, according to an embodiment of the present invention.

Referring now to FIG. 20, which shows a block diagram of the basic procedure a receiver uses when decoding tag transmissions (with no redundant channels), according to some embodiments of the invention. The process may begin with the receiver camera capturing a series of at least "Np" video frames that include images of the modulated light beams 2001, "Np" being the number of data blocks comprised in a data packet. Next, the dedicated tag reading algorithm may analyze the video frames trying to detect all pulse images in all the frames to obtain a complete set of the spatial and temporal raw data 2002. Some of the frames, however, may include ambiguities due to partially exposed pulse images, or due to other sources of channel/receiver noise.

In some embodiments, when bad frames are detected 2003, the dedicated tag reading algorithm may instruct the camera to capture another series of "Np" video frames 2004 which may then be processed in the same manner described above 2005. At this point there should be enough video frames to identify at least two header sections indicating the beginning of the payload section of the data packet 2006. Once the correct order of the data blocks is established, it may be easy to replace bad blocks from one series of frames with their good counterparts in another series of frames in order to obtain a single contiguous data set that contains all the information needed to restore the data packet(s) 2007. In cases where good data blocks are still missing, additional sequences of at least "Np" video frames may be captured until a contiguous set of good data blocks is obtained 2008. The original data packet(s) may then be restored 2009 by reversing the schemes used to encode the data.

It is generally possible, by properly adjusting the time variables of the system, to have partially exposed frames occur once every series of "Np" video frames taken, or even less frequent than that, for instance not having two bad frames during the transmission of a single data packet. Furthermore, it may be possible to have the repetition of partially exposed frames NOT equal to "Np" or to an integer multiple thereof. Furthermore, it may be possible to have only one partially exposed frame at a time (i.e. never two in a row). Optionally, it may be possible to identify a single header block even if it is partly exposed, as no data block in that data packet is also partially exposed.

Figure 21:
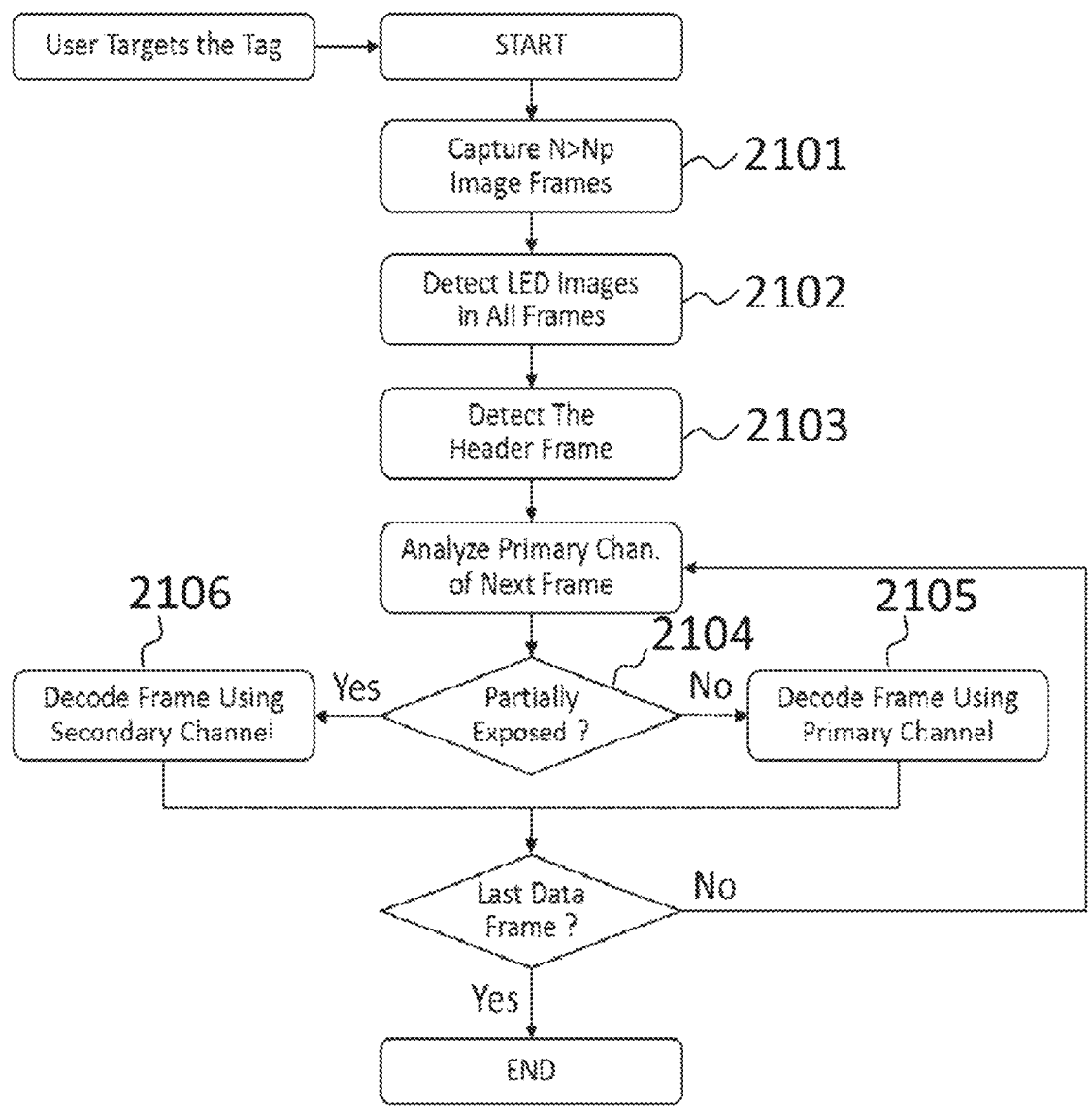
FIG. 21 a block diagram of the logic used by the receiver when decoding signals transmitted using redundant phase-shifted channels, according to an embodiment of the present invention.

Referring now to FIG. 21, which shows a block diagram of the logic used by the receiver when decoding signals transmitted using redundant phase-shifted channels, according to some embodiments of the invention.

The process may begin with the camera of the receiver capturing a series of at least "Np" video frames that include records of modulated light beams of the optical tag 2101. Next, the dedicated tag reading algorithm of the receiver may analyze the frames to obtain a complete set of raw data across the spatial, temporal and the color domains 2102. A header section(s) may then be located in the data to indicate the beginning of the payload section of the data packet 2103. Each data frame may be checked for partially exposed LED images 2104, and if none are found, decoding may be proceeded using the primary channels 2105. If ambiguous LED images are found, then the corresponding bit values are recovered using the minor channels 2106. The process may be completed once all data blocks have been correctly recovered and the original data packet has been reconstructed.

Figure 22:
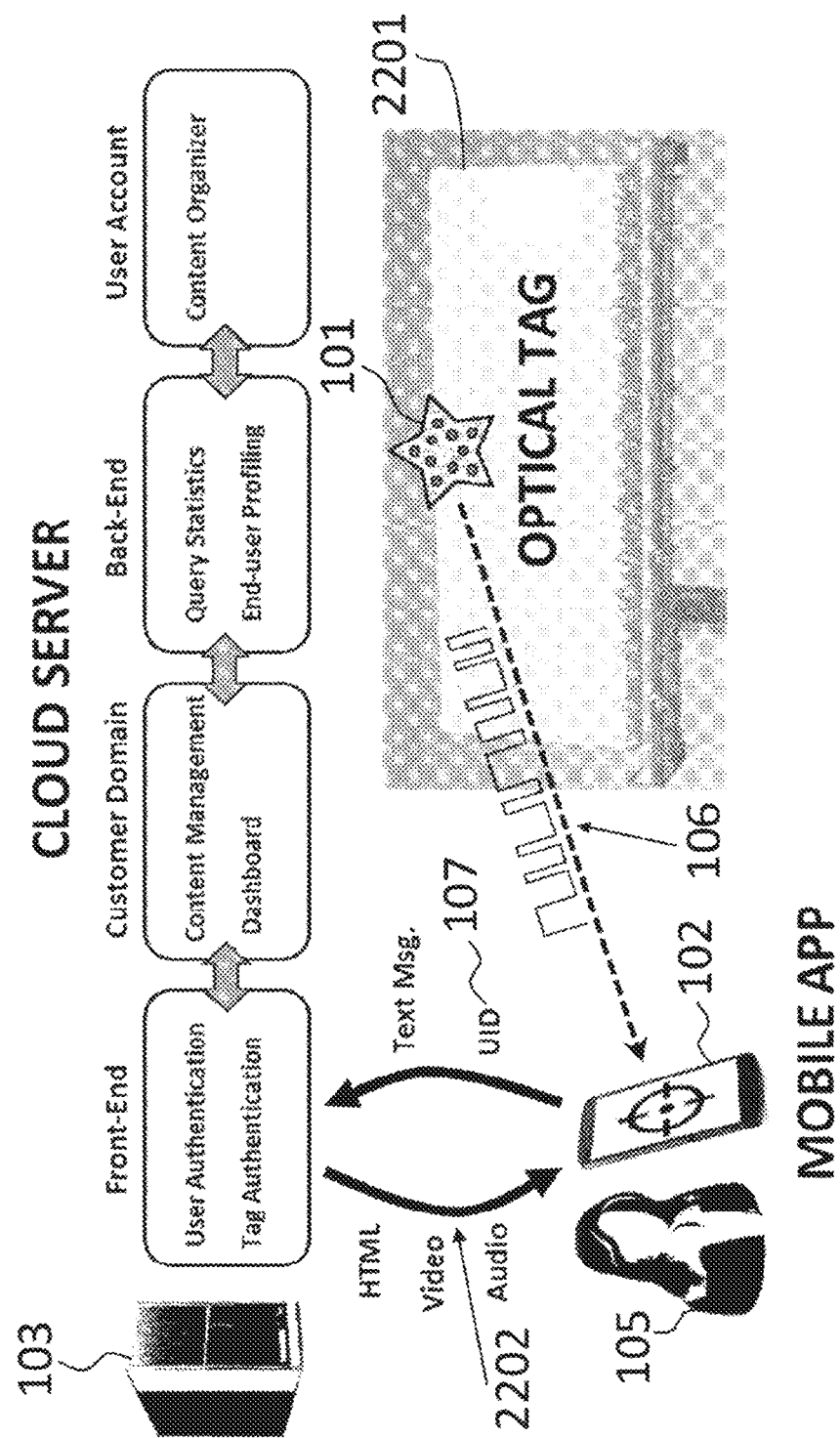
FIG. 22 schematically illustrates a possible utility of the optical tag in the field of out-of-home (OOH) advertising, according to an embodiment of the present invention.

Referring now to FIG. 22, which schematically illustrates a possible utility of the optical tag in the field of out-of-home (OOH) advertising, according to some embodiments of the invention. It should be noted that the tag 101 may be affixed to a billboard frame 2201 and serve as a link to online content that is complementary to the advertisement displayed.

When the user 105 aims mobile device 102 at optical tag 101, the dedicated tag reading algorithm of the device 102 may employ the camera to identify and decode binary signals 106 that are associated with the light emissions of optical tag 101. The information so conveyed may include at least one unique identifier (UID) 107 that explicitly identifies the billboard. The dedicated tag reading algorithm may further communicate with an external computerized device 103, through some local-area-network or a wide-area-network. It may therefore send the UID of optical tag 101 to external computerized device 103, along with additional information, in order to retrieve ad-related content 2202. The additional information sent to the server may include for example: identification data of the reader device, geo-location of the reader device, information pertaining to the user of the reader device, a text message to be send, etc. External computerized device 103 (e.g. a cloud based server) may aggregate, store, manage, analyze, and further transmit information that relates to the plurality of optical tags and readers thereof that are in general communication with the server.

Figure 23:
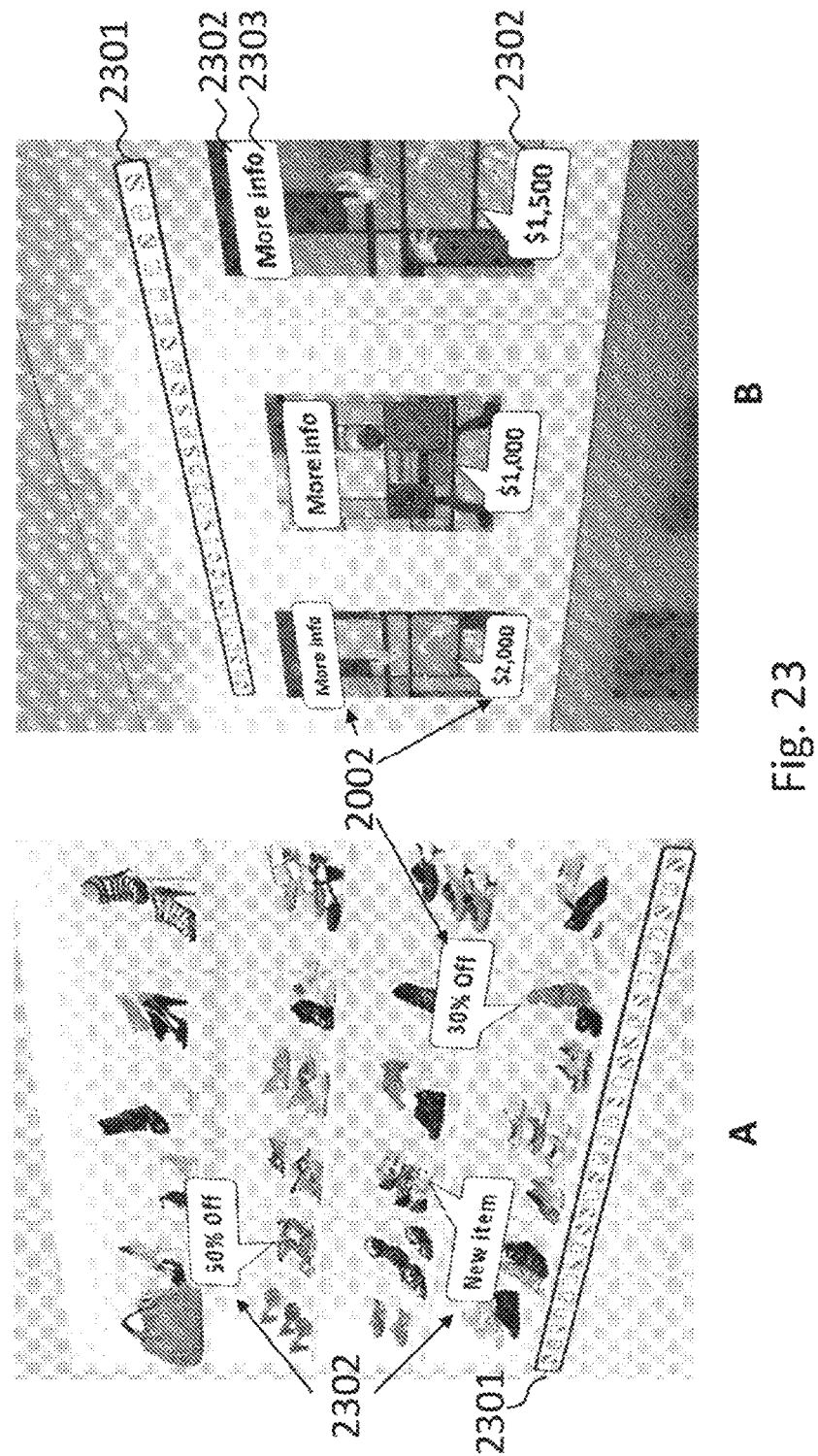
FIG. 23 schematically illustrates two utilities made possible using a linear optical tag that are related to in-store retail (A) and to exhibitions (B), according to an embodiment of the present invention.

Referring now to FIG. 23, which schematically illustrates two utilities made possible using a linear optical tag that are related to in-store retail (A) and to exhibitions (B), according to some embodiments of the invention. It should be noted that when linear optical tag 2301 is placed horizontally along the base of a product display (A) or at the top of an exhibition wall (B) it may define vertical two-dimensional planes in which every point is addressable.

It is appreciated, nevertheless, that linear optical tag 2301 may be placed at any elevation and at any orientation within the designated two-dimensional plane. In particular, the optical tag may be positioned vertically. When a user aims a camera-equipped mobile device configured as reader of the optical tag, the dedicated tag reading algorithm of the device may read information conveyed by various sites (or sub-arrays) along the linear optical tag (including, but not limited to UIDs) and use this information to retrieve prescribed information from a server computer through a wireless network.

The dedicated tag reading algorithm may then use pixel measurements among LED projections on the image sensor to relate different parts of the information to different points within the 2D plane defined by the linear optical tag. Optionally, certain parts of the information 2302 may be presented to the end-user in a graphical way, such that the graphics overlay the actual scene shown on the screen of the mobile device.

According to some embodiments, parts of the information overlaid on the screen may be interactive 2303. Namely, they may perform as buttons that trigger device-related events or as hyper-links to additional information.

In some embodiments, parts of the information that are graphically overlaid on the display screen of the reader device may be three-dimensional in nature. For example, the graphics may embody the visual representation of a product or of a building. Such 3D visuals may be dynamic and/or interactive. That is, the user may be able to move or rotate the virtual object using gestures of his fingers or by walking to a nearby location while the 3D visuals change their appearances accordingly.

Figure 24:
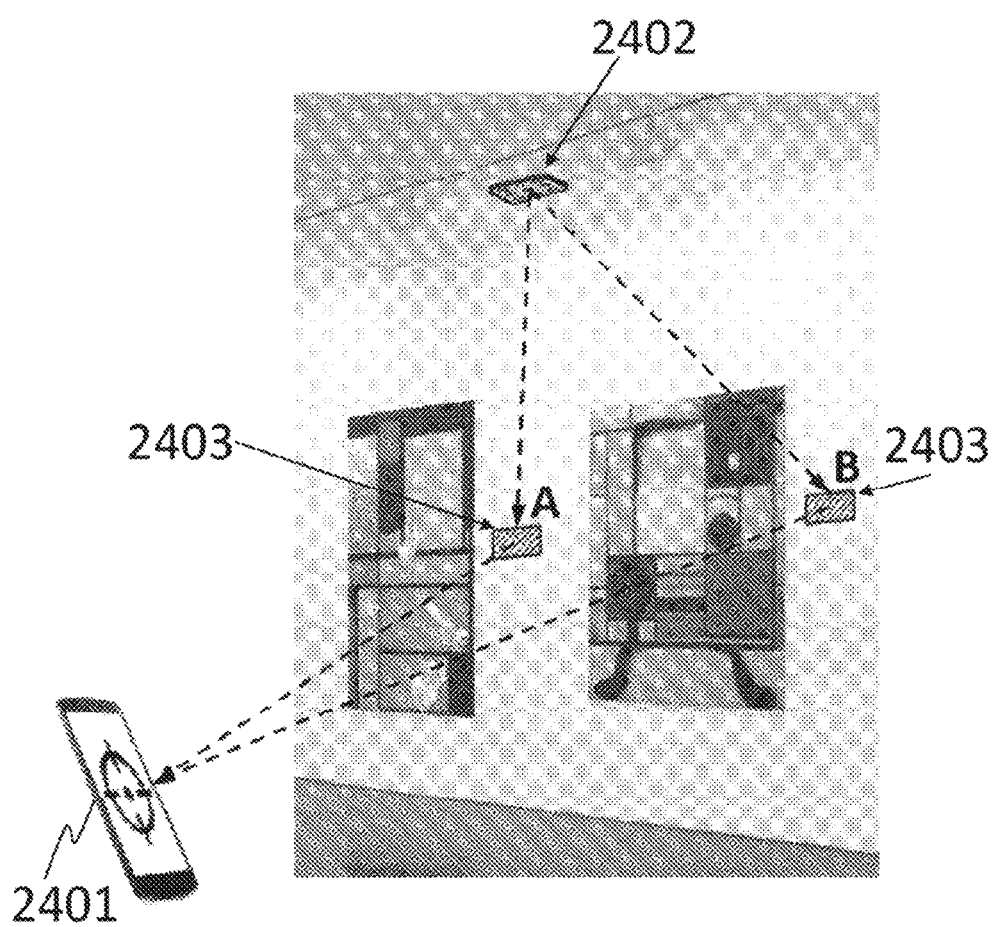
FIG. 24 schematically illustrates an optical tag apparatus wherein the reader device is not positioned within a line-of-sight of the tag, according to an embodiment of the present invention.

Referring now to FIG. 24, which schematically illustrates an optical tag apparatus wherein the reader device 2401 is not positioned within a line-of-sight of the tag 2402, according to some embodiments of the invention.

In some embodiments, light beams of the various light emitting elements of the tag may be projected onto one or more reflective surfaces 2403 from which the beams are deflected in an angle before being captured by the image sensor of the reader device 2401. To be effective, such embodiments may employ directional light emitting elements, such as laser diodes, that emit collimated light beams. Optionally, optical tag 2402 concurrently emits at least two structured groups of modulated light beams, each conveying a different stream of information. Each group of light beams may be directed (e.g. using acousto-optic modulator) onto a different reflective surface 2403: for instance surface A and surface B.

It is appreciated that though a single optical tag may emit multiple structured groups of light beams aimed in several directions (for example—hemi spherically), each group may carry a different stream of information. In some embodiments, the farthest reflective surface on the path of each group of beams may be diffusive to allow multiple receiver devices to read the information conveyed by those beams from different angles.

Figure 25:
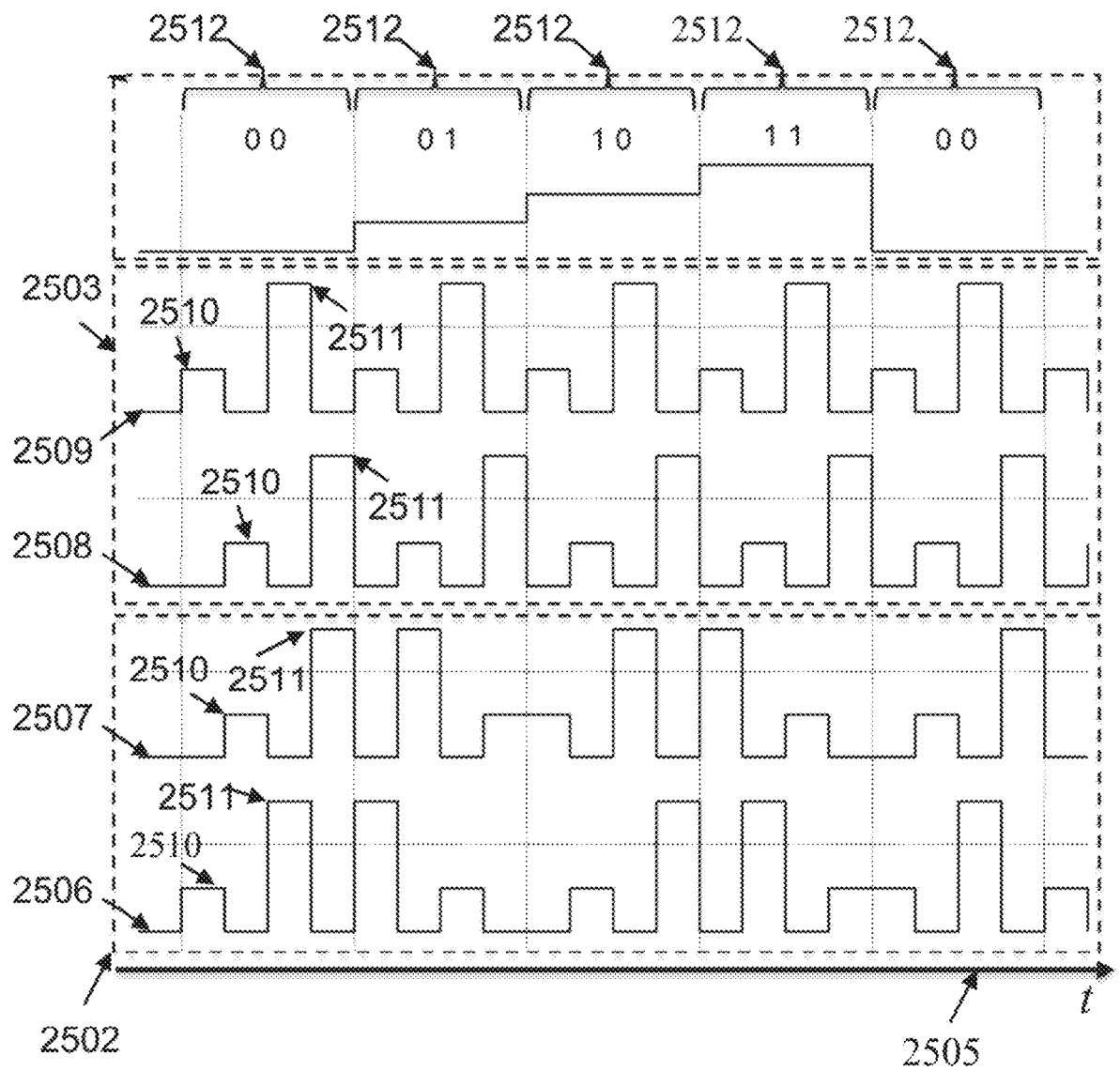
FIG. 25 schematically illustrates a modulation scheme including a combination of color modulation and amplitude modulation, according to some embodiments of the invention.

Referring now to FIG. 25, which schematically illustrates a modulation scheme 2501 including a combination of color modulation and amplitude modulation, according to some embodiments of the invention.

As shown in FIG. 25, modulation scheme 2501 may include a data part 2502, and an optional clock part 2503. Baud part 2504 shows the exemplary data values, or symbols, as represented in data part 2502. FIG. 25 is a temporal diagram with the time flowing according to time arrow 2505. Each of data part 2502 and an optional clock part 2503 may include any number of sequences of light pulses where the pulse to the right is later in time than the pulse to the left.

FIG. 25 shows two pulse sequences for data part 2502, designated by numerals 2506 and 2507, and two pulse sequences for clock part 2503, designated by numerals 2508 and 2509. It is appreciated that there may be further sequences, or pairs of sequences, of data parts such as data part 2502.

Each sequence (or series) of pulses in the exemplary data part 2502 and clock part 2503 is of a particular color (colors may change for each symbol or a group of symbols emitted), where the two colors of pulses in each of the data part and the clock part are mutually complementary. For example, pulse series 2506 of data part 2502 is of a first color, and pulse series 2507 of data part 2502 is of a second color. The first color and the second color are complementary in the sense that the human eye perceives the combination or mix of the first color and the second color as a third color, such as a white or gray color. In fact, any two colors are complementary to each other in the sense that they yield some third (mixed) color. In case more than one pair of colors are used in data part 2502 or in clock part 2503 to increase the number of possible symbols, then all color pairs used must yield the same mixed color in order to avoid visible flicker. Typically, this is possible with color pairs which yield a combined (perceived) grayscale color or near-white hue.

In other words, given that the repetition rate of the pulses is higher than a color-fusion threshold of the human eye, the human eye perceives the chromatic combination of the pulses of the first and second colors as being constant. The same applies to clock part 2503.

In the system and method described hereinbelow, light pulses are produced by a light emitting element such as a LED (light emitting diode), which may include a plurality of sub-emitters, typically three. Each sub emitter may produce light of a particular color (e.g. red, green or blue) and a particular intensity. Therefore, each pulse sequence of a particular color may be generated by a respective light emitting element using a particular group of sub emitters.

For example, pulse series 2506 of data part 2502 including pulses of the first color may be generated by the light emitting element using a first group of light emitting sub-elements, while the pulse series 2507 of data part 2502 including pulses of the second color may be generated by the light emitting element using a second group of light emitting sub-elements. The same applies to clock part 2503. It is appreciated that a group of light emitting sub-elements may include one or more sub-elements.

In this sense, both pulse series 2506 and pulse series 2507 may be produced by the same light emitting element, interleaving the pulses of pulse series 2506 and pulse series 2507. As shown, for example, in FIG. 25, every transmitted pulse of a first series of pulses may be followed by a period of no light in which a pulse of the other series of pulses is transmitted.

As shown in FIG. 25, modulation scheme 2501 may include pulses of a plurality of distinct amplitudes (light intensities), such as a first amplitude 2510, and a second amplitude 2511. It is appreciated that while FIG. 25 shows two distinct amplitudes, any number of amplitudes may be used, including for example, at least four distinct amplitudes, or even at least eight distinct amplitudes.

As shown in FIG. 25, clock part 2503 of modulation scheme 2501 may include a particular repetition of a sub-series of pulses of colors and amplitudes. As shown in FIG. 25, clock part 2503 may include a pair of pulses of a first amplitude of the first and second colors followed by a pair of pulses of a second amplitude of the first and second colors. Any such arrangement of complementary colors and different amplitudes may be used provided that the particular combined sequence is repeated (as shown in FIG. 25). Each such repetition is termed herein a baud, or a baud period 2512. The baud period applies to the particular sub-series of pulses of clock part 2503 as well as the concurrent pulses of data part 2502.

Hereinbelow, the term chromaticity and color may be used interchangeably, representing any particular value of saturation and hue, as perceived by the human eye. The term luminosity or intensity of the light may represent the amplitude of the light pulse as perceived by the human eye.

It is appreciated that an optical sensor, or an image sensor, such as a digital camera, may also sense saturation, hue, and luminosity, however, generating different parameters.

For example, in modulation scheme 2501 as shown in FIG. 25, the combination of light pulses within any particular baud period 2512, produces a constant resultant chromaticity and resultant luminosity. In this respect, the length, in time, of baud period 2512, is short enough, so that the time resolution of the human eye cannot differentiate between the different colors and the different amplitudes of the different pulses of the same baud period 2512 of either the clock part 2503, and the data part 2502. To the human eye, each of clock part 2503, and data part 2502 produce a constant color and constant amplitude (chromaticity and luminosity) in time.

As shown in FIG. 25, data part 2502 modulation scheme 2501 may include in each baud period 2512 a different sequence of pulses of one color pair and at least one amplitude pair, representing a particular data value, or symbol. FIG. 25 shows four such symbols (using one color pair and one amplitude pair) representing, for example, data values (bit values) of [0,0], [0,1], [1,0], and [1,1].

It is appreciated that, for data part 2502, different pairs of complementary colors may be used for each consecutive baud period 2512, representing different values, or symbols, as long as the resultant chromaticity and the resultant luminosity are constant throughout data part 2502.

Similarly, for clock part 25023, different pairs of complementary colors may be used for each consecutive baud period 2512, as long as the same particular order of amplitudes and the same particular order of first and second colors are repeated, and as long as the resultant chromaticity and the resultant luminosity are constant throughout clock part 2503.

Additionally and/or optionally, various color pairs can be used, for example, throughout the clock signal, for example to calibrate the receiver.

It is appreciated that baud period 2512 may include more than the four pulses as shown in FIG. 25, and therefore baud period 2512 may carry more than the four symbols shown in FIG. 25. However, it is appreciated that baud period 2512 should be short enough, below the time resolution of the human eye, to provide a constant, non-flickering, chromaticity and luminosity, and that the light pulses should be long enough, or have a pulse rate low enough, such that individual pulses can be detected by a regular frame rate of a commercial video camera.

It is appreciated that the method of producing an optical transmission of data, for example, according to modulation scheme 2501 as described above, may include the following action:

The method may determine a length of a repetitive time period, such as baud period 2512. Such time period may not be longer than time resolution of a human eye, and may not be significantly longer than a frame period of a commercial video camera.

Further, the method may emit a first sequence of light pulses within the time period as determined (e.g., baud period 2512), where the light pulses may include pulses of two complementary colors and pulses of different levels of luminosity (e.g., pulse amplitude).

The method may further determine the order of the colors and the order of the levels of luminosity of the first sequence of light pulses emitted within the time period to represent a data value (symbol), and to achieve perceived (or cumulative) chromaticity, and cumulative and/or average luminosity, that are substantially constant to a human eye.

The method may further include the following actions:

The method may emit a second sequence of light pulses within the same time period, the light pulses of the second sequence may include pulses of two complementary colors and pulses of different levels of luminosity to achieve perceived (or cumulative) chromaticity and cumulative and/or average luminosity that is substantially constant to a human eye.

The method may further determine the order of the colors and levels of luminosity of the first sequence of light pulses emitted within the time period to represent a data value (symbol). Such data value may be based on time correlation, and/or color correlation and/or luminosity correlation, with the second sequence of light pulses. The first sequence of light pulses may be equivalent to data part 2502, and the second sequence of light pulses may be equivalent to clock part 2503. The perceived (or cumulative) chromaticity of the first sequence of light pulses and the second sequence of light pulses being typically substantially constant to the human eye. (e.g., over consecutive number of baud periods 2512). It is appreciated that a data value is assigned to a specific pulse sequence independently of the clock, and the clock pulses are merely a mechanism for deciphering and/or demodulating the data value.

The method may further include the actions of arranging each light pulse to be followed by a time period of no light, and arranging the length of time of the light pulse and the following time period of no light to comply with the frame rate of a standard camera, such that an integer number of the combined time period is equal to or smaller than the inverse of the frame rate of a standard camera.

A transmitter device, such as an optical tag, transmitting optical communication signals such as according to modulation scheme 2501, may include one or more data light emitting element. Each such data light emitting element may include a plurality of sub-emitters, typically three sub-emitters, each emitting light in a particular color spectrum, such as red, green, and blue.

Each such data light emitting element may include a first group of one or more sub-emitters configured to emit light at respective first color and at least two levels of luminosity, as well as a second group of one or more sub-emitters configured to emit light at respective second color mutually complementary to the first color and at least two levels of luminosity.

The transmitter device may therefore modulate light emissions of the data light emitting element to emit at least two symbols of information during two clock periods. These two clock periods may include a sequence of:

a first light pulse comprising the first color having a first intensity, during a first part of a first clock period;

followed by a second light pulse comprising the second color having a second intensity, during a second part of the first clock period;

followed by a third light pulse comprising the first color having a third intensity, during a first part of a second clock period; and followed by a fourth light pulse comprising the second color having a fourth intensity, during a second part of the second clock period.

The transmitter device may therefore modulate light emissions of the data light emitting element(s) so that the perceived chromaticity of the light pulses during the first clock period is substantially similar to perceived chromaticity of said light pulses during said second clock period.

Hence, the transmitter device may modulate light emissions of the data light emitting element(s) so that the cumulative luminosity (intensity) and/or average luminosity (intensity) of the pulses of the first and second colors during the first and second clock periods is perceived as substantially equal for a plurality of repeating clock periods.

The transmitter device may further modulate light emissions so that the intensities of pulses of any of the first and second colors, respectively, within each of a plurality of said repeating time periods, are substantially different. Where, as explained above, a particular order of colors and intensities (luminosity levels) of the light pulses within the clock period may represent a particular symbol (data value).

The transmitter device (optical tag) may also include at least one clock light emitting element that may include a third group of one or more sub-emitters configured to emit light at respective third color and at least two intensity levels, and a fourth group of one or more sub-emitters configured to emit light at respective fourth color mutually complementary to said third color and at least two intensity levels.

The transmitter device may modulate light emissions of the clock light emitting element forming repeated clock periods, each including a first sequence of light pulses and a second sequence of light pulses.

The first sequence of light pulses may include a first light pulse of a third color having a first intensity, emitted during a first part of a first clock period, followed by a second clock period of no light emission, followed by a second light pulse comprising a fourth color having a second intensity during the second part of said first clock period, and followed by a fourth clock period of no light emission The second sequence of light pulses may include the first clock period of no light emission, followed by a third light pulse comprising the first color having a third intensity during a first part of a second clock period, followed by the third clock period of no first light emission, followed by a fourth light pulse including the second color having a fourth intensity, during a second part of the second clock period.

The transmitter device may modulate light emissions so that the cumulative intensity and/or the average intensity, of the first light pulse, the second light pulse, the third light pulse, and the fourth light pulse, is substantially constant for the repeating clock periods.

In other words, the transmitter device may modulate light emissions so that the perceived luminosity of the first light pulse, the second light pulse, the third light pulse, and the fourth light pulse is substantially constant for the repeating clock periods.

The transmitter device may also modulate light emissions so that the perceived chromaticity of the first light pulse, the second light pulse, the third light pulse, and the fourth light pulse is substantially constant during the repeating clock periods.

The transmitter device when modulating light emissions according to modulation scheme 2501, may determine a symbol for transmission based on correlation between the light pulses of the clock light emitting element and light pulses of a data light emitting element. Or by determining the order of the intensities and colors of the light pulses of a data light emitting element in correlation with order of the intensities and colors of said light pulses of the clock light emitting element to represent the symbol.

Similarly, a receiver device, when demodulating light emissions according to modulation scheme 2501, may determine (detect) a symbol based on correlation between the light pulses of the clock sequence of light pulses, and the sequence of light pulses of a data light emitting element. And/or by determining the order of the intensities and colors of the light pulses of a data light emitting element in correlation with order of the intensities and colors of said light pulses of the clock light emitting element to represent the symbol.

Unless explicitly stated, the method embodiments described herein are not constrained to a particular order in time or chronological sequence. Additionally, some of the described method elements may be skipped, or they may be repeated, during a sequence of operations of a method. Various embodiments have been presented. Each of these embodiments may of course include features from other embodiments presented, and embodiments not specifically described may include various features described herein.

The invention claimed is:

1. A method for communicating information, the method comprising:
    determining length of a repetitive time period not longer than time resolution of a human eye;
    emitting a first sequence of light pulses within said time period, said light pulses comprising pulses of complementary colors and pulses of different levels of luminosity; and
    determining order of said colors and levels of luminosity of said first sequence of light pulses emitted within said time period to represent a symbol, and to achieve perceived chromaticity and luminosity that is substantially constant to a human eye.

2. The method according to claim 1, additionally comprising:
    emitting a second sequence of light pulses within said time period, said light pulses of said second sequence comprising pulses of complementary colors and pulses of different levels of luminosity to achieve perceived chromaticity and luminosity that is substantially constant to a human eye; and
    determining order of said colors and levels of luminosity of said first sequence of light pulses emitted within said time period to represent a symbol based on at least one of: time correlation, color correlation, and luminosity correlation, with said second sequence of light pulses.

3. The method according to claim 1, additionally comprising:
    providing at least one data light emitting element comprising:
        a first group of at least one sub-emitter configured to emit light at respective first color and at least two levels of luminosity; and
        a second group of at least one sub-emitter configured to emit light at respective second color mutually complementary to said first color and at least two levels of luminosity;
    modulating light emissions of said data light emitting element to emit at least two symbols of said information during two clock periods comprising a sequence of:
        a first light pulse comprising said first color having a first intensity, during a first part of a first clock period;
        followed by a second light pulse comprising said second color having a second intensity, during a second part of said first clock period;
        followed by a third light pulse comprising said first color having a third intensity, during a first part of a second clock period; and
        followed by a fourth light pulse comprising said second color having a fourth intensity, during a second part of said second clock period;
    wherein said first, second, third and fourth light pulses are arranged to provide at least one of:
        perceived chromaticity of said light pulses during said first clock period is substantially similar to perceived chromaticity of said light pulses during said second clock period; and
        perceived luminosity of said light pulses during said first clock period is substantially similar to perceived luminosity of said light pulses during said second clock period.

4. The method according to claim 3, wherein at least one of:
    at least one of cumulative intensity and average intensity of said pulses of said first and second colors during said first and second clock periods is perceived as substantially equal for a plurality of repeating clock periods; and
    said intensity of said pulses of said first color is substantially different within each of said repeating clock periods, and said intensity of said pulses of said second color is substantially different within each of said repeating clock periods.

5. The method according to claim 3, wherein a particular order of colors and intensities of said light pulses within said clock period represents a particular symbol.

6. The method according to claim 3, additionally comprising:
    providing at least one clock light emitting element comprising:
        a third group of at least one sub-emitter configured to emit light at respective third color and at least two intensity levels; and a fourth group of at least one sub-emitter configured to emit light at respective fourth color mutually complementary to said third color and at least two intensity levels;

modulating light emissions of said clock light emitting element comprising repeated clock periods comprising:
a first light pulse comprising said third color having a first intensity, during a first part of a first clock period;
followed by a second light pulse comprising said fourth color having a second intensity, during said second part of said first clock period; and
followed by a third light pulse comprising said third color having a third intensity, during a first part of a second clock period; and
followed by a fourth light pulse comprising said fourth color having a fourth intensity, during a second part of said second clock period;
wherein said first, second, third and fourth light pulses are arranged to provide at least one of:
perceived luminosity of said first, second, third and fourth light pulses is substantially constant during said repeating clock periods; and
perceived chromaticity of said first, second, third and fourth light pulses during said repeating clock periods are substantially constant.

7. The method according to claim 6, additionally comprising at least one of:
determining said symbol using correlation between said light pulses of said at least one clock light emitting element and said light pulses of said at least one data light emitting element;
determining order of intensities of said light pulses of said at least one data light emitting element in correlation with order of said intensities of said light pulses of said at least one clock light emitting element to represent said symbol.

8. An optical communication transmitter comprising:
at least one data light emitting element comprising:
a first group of at least one sub-emitter configured to emit light at respective first color and at least two levels of luminosity; and
a second group of at least one sub-emitter configured to emit light at respective second color mutually complementary to said first color and at least two levels of luminosity; and
a controller coupled to said data light emitting element and operative to modulate light emissions of said data light emitting element by performing the actions of:
determining length of a repetitive time period not longer than time resolution of a human eye;
emitting a first sequence of light pulses within said time period, said light pulses comprising pulses of complementary colors and pulses of different levels of luminosity; and
determining order of said colors and levels of luminosity of said first sequence of light pulses emitted within said time period to represent a symbol, and to achieve perceived chromaticity that is substantially constant to a human eye.

9. The optical communication transmitter according to claim 8, wherein said controller is additionally operative to perform actions comprising:
emitting a second sequence of light pulses within said time period, said light pulses of said second sequence comprising pulses of complementary colors and pulses of different levels of luminosity to achieve perceived chromaticity that is substantially constant to a human eye; and
determining order of said colors and levels of luminosity of said first sequence of light pulses emitted within said time period to represent a symbol based on at least one of: time correlation, color correlation, and luminosity correlation, with said second sequence of light pulses;
wherein perceived chromaticity of said first sequence of light pulses and said second sequence of light pulses is substantially constant to a human eye.

10. The optical communication transmitter according to claim 8, wherein said controller is additionally operative to perform actions comprising:
wherein each light pulse is followed by a time period of no light; and
wherein an integer number of lengths of time of said light pulse and said following time period of no light is equal to or smaller than the inverse of the frame rate of a standard camera.

11. The optical communication transmitter according to claim 8, wherein said controller is additionally operative to perform actions comprising:
modulating light emissions of said data light emitting element to emit at least two symbols of said information during two clock periods comprising a sequence of:
a first light pulse comprising said first color having a first intensity, during a first part of a first clock period;
followed by a second light pulse comprising said second color having a second intensity, during a second part of said first clock period;
followed by a third light pulse comprising said first color having a third intensity, during a first part of a second clock period; and
followed by a fourth light pulse comprising said second color having a fourth intensity, during a second part of said second clock period;
wherein said first, second, third and fourth light pulses are arranged to provide at least one of:
perceived chromaticity of said light pulses during said first clock period is substantially similar to perceived chromaticity of said light pulses during said second clock period; and
perceived luminosity of said light pulses during said first clock period is substantially similar to perceived luminosity of said light pulses during said second clock period.

12. The optical communication transmitter according to claim 11, wherein said controller is additionally operative to perform actions comprising at least one of:
modulating light emissions so that at least one of cumulative intensity and average intensity of said pulses of said first and second colors during said first and second clock periods is perceived as substantially equal for a plurality of repeating clock periods; and
modulating light emissions so that said intensity of said pulses of said first color is substantially different within each of a plurality of said repeating time periods, and said intensity of said pulses of said second color is substantially different within each of a plurality of said repeating time periods.

13. The optical communication transmitter according to claim 11, wherein said controller is additionally operative to modulate said light emissions so that a particular order of intensities of said light pulses within said clock period represents a particular symbol.

14. The optical communication transmitter according to claim 11, additionally comprising:
  a clock light emitting element comprising:
   a third group of at least one sub-emitter configured to emit light at respective third color and at least two intensity levels; and
   a fourth group of at least one sub-emitter configured to emit light at respective fourth color mutually complementary to said third color and at least two intensity levels;
  wherein said controller is additionally operative to modulate light emissions of said clock light emitting element comprising repeated clock periods comprising:
   a first light pulse comprising said third color having a first intensity, during a first part of a first clock period;
   followed by a second light pulse comprising said fourth color having a second intensity, during said second part of said first clock period; and
   followed by a third light pulse comprising said third color having a third intensity, during a first part of a second clock period; and
   followed by a fourth light pulse comprising said fourth color having a fourth intensity, during a second part of said second clock period;
  wherein at least one of cumulative intensity and average intensity of said first light pulse, and said second light pulse is substantially equal for said repeating clock periods.

15. An optical receiver comprising:
 an optical sensor; and
 a controller controllably coupled to said optical sensor, the controller being operative to demodulate an optical signal detected by said optical sensor by performing actions comprising:
  identifying a clock signal comprising a repeated sequence of light pulses comprising two colors and two levels of luminosity;
  identifying a data signal comprising light pulses comprising two colors and two levels of luminosity;
  determining a symbol using correlation between said light pulses of said clock signal and said light pulses of said data signal;
 wherein said clock signal comprises a repetitive time period not longer than time resolution of a human eye; and
 wherein said data signal comprises light pulses of perceived chromaticity and luminosity within said time period that is substantially constant to a human eye.

* * * * *